US011853851B2

United States Patent
Keyngnaert et al.

(10) Patent No.: US 11,853,851 B2
(45) Date of Patent: Dec. 26, 2023

(54) SYSTEMS AND METHODS FOR TRAINING AND EMPLOYING MACHINE LEARNING MODELS FOR UNIQUE STRING GENERATION AND PREDICTION

(71) Applicant: Camelot UK Bidco Limited, London (GB)

(72) Inventors: Peter Keyngnaert, Landegem (BE); Jan Waerniers, Aalter (BE); Ann Smet, Stekene (BE); Akanksha Mishra, Boston, MA (US)

(73) Assignee: Camelot UK Bidco Limited, London (GB)

( * ) Notice: Subject to any disclaimer, the term of this patent is extended or adjusted under 35 U.S.C. 154(b) by 654 days.

(21) Appl. No.: 16/592,137

(22) Filed: Oct. 3, 2019

(65) Prior Publication Data

US 2020/0111021 A1   Apr. 9, 2020

Related U.S. Application Data

(60) Provisional application No. 62/740,820, filed on Oct. 3, 2018.

(51) Int. Cl.
*G06N 20/00* (2019.01)
*G06F 40/30* (2020.01)
*G06N 7/01* (2023.01)

(52) U.S. Cl.
CPC ............ *G06N 20/00* (2019.01); *G06F 40/30* (2020.01); *G06N 7/01* (2023.01)

(58) Field of Classification Search
CPC ........ G06N 20/00; G06N 3/044; G06N 3/045; G06N 3/047; G06N 3/049; G06N 3/084; G06N 3/088; G06N 5/01; G06N 5/022; G06N 5/025; G06N 5/048; G06N 20/20; G06F 40/30; G06F 40/216; G06F 40/56
See application file for complete search history.

(56) References Cited

U.S. PATENT DOCUMENTS

| 7,783,428 | B2 | 8/2010 | Gustafsson et al. |
| 11,599,927 | B1* | 3/2023 | Flunkert ................. G06F 40/10 |
| 2011/0144992 | A1 | 6/2011 | Toutanova et al. |
| 2013/0066818 | A1 | 3/2013 | Assadollahi et al. |

(Continued)

OTHER PUBLICATIONS

Ni Lao, Efficient Random Walk Inference with Knowledge Bases, Nov. 27, 2019, CMU-LTI-12-010.*

(Continued)

*Primary Examiner* — Anh Nguyen
(74) *Attorney, Agent, or Firm* — McCarter & English, LLP

(57) ABSTRACT

Systems and methods for generating strings based on a seed string are disclosed. Machine learning models are trained using domain-specific training data. Random walk models are derived from the trained machine learning models. A seed string is input into each of the random walk models, and each of the random walk models iteratively generate one or more next characters for the seed string to generate at least one term from each of the random walk models. A predicted class for the at least one term generated by each of the random walk models can be determined, and a ranked order for the at least one term generated by each of the random walk models with the predicted classes can be output to a graphical user interface.

20 Claims, 16 Drawing Sheets

(56) References Cited

U.S. PATENT DOCUMENTS

| | | |
|---|---|---|
| 2013/0218821 A1 | 8/2013 | Szatmary et al. |
| 2014/0136567 A1 | 5/2014 | Bhalotia |
| 2014/0214405 A1* | 7/2014 | Ouyang .............. G06F 3/04886 704/9 |
| 2016/0260033 A1 | 9/2016 | Keyngnaert et al. |
| 2017/0193619 A1 | 7/2017 | Rollins et al. |
| 2018/0212926 A1* | 7/2018 | Cholleton ............. H04L 61/302 |
| 2018/0268038 A1 | 9/2018 | Keyngnaert et al. |

OTHER PUBLICATIONS

International Search Report and Written Opinion from International Patent Application No. PCT/US2019/054469 dated Dec. 27, 2019.
Lao, Ni, Efficient Random Walk Inference with Knowledge Bases, Thesis from Language Technologies Institute School of Computer Science at Carnegie Mellon Univeristy, 2012.
European Search Report from related European Patent Application No. 19869370.7 dated May 31, 2022.

* cited by examiner

1000

| Training sample count | Input | Output |
|---|---|---|
| 1 | <start> | T |
| 2 | <start>T | R |
| ... | ... | ... |
| 8 | <start>TRAVINO | L |
| 9 | <start>TRAVINOL | <end> |

| Input | Output | Sample Chosen from the output |
|---|---|---|
| <start> | [A : 0.03, B : 0.09, C : 0.12, ...., Z : 0.001, <end> : 0.0001] | C |
| <start>C | [A : 0.27, B : 0.001, C : 0.0007, ...., Z : 0.001, <end> : 0.001] | A |
| <start>CA | [A : 0.11, B : 0.13, C : 0.07, ...., Z : 0.0019, <end> : 0.001] | B |
| <start>CAB | [A : 0.10, B : 0.07, C : 0.03, ...., Z : 0.0013, <end> : 0.18] | <end> |
| <start>CAB<end> | | |

FIG. 11

Most Likely, High Tolerance, High G&S Bias

1400 →

| P(n\|s) = 10⁻ˣ | Class Bias | Trademark Name |
|---|---|---|
| 4.65 | 0.52 | FRIDAY'S |
| 4.86 | 0.72 | FRIENDLY'S |
| 4.94 | 1 | FRICKLES |
| 4.99 | 0.99 | FRITOS |
| 5.03 | 0.58 | FRISCO |
| 5.25 | 1 | FRITES |
| 5.28 | 1 | FRIENDSHIP FOODS |
| 5.44 | 1 | FRIJOL |
| 5.44 | 1 | FRIENDLY FRUIT |
| 5.46 | 0.96 | FRIES |
| 5.48 | 1 | FRIENDLY FOODS |
| 5.48 | 0.66 | FRITAS |
| 5.54 | 0.69 | FRITO LAY'S |
| 5.54 | 1 | FRIJOLES |
| 5.55 | 0.56 | FRICKIN |
| 5.62 | 0.57 | FRINKS |
| 5.68 | 0.85 | FRIORI |
| 5.7 | 1 | FRIJOLE |
| 5.72 | 1 | FRIENDLY FARMS |
| 5.72 | 0.62 | FRIEND'S |

FIG. 14

Low Creativity, High Tolerance, High G&S Bias

| $P(n|s) = 10^{-x}$ | Class Bias | Trademark Name |
|---|---|---|
| 5.83 | 1 | FRIENDLY FISH |
| 5.85 | 0.74 | FRIENDLY FRESH |
| 5.99 | 0.59 | FRIENDLY FLAVOR |
| 6.31 | 1 | FRIED FARMS |
| 6.96 | 1 | FRITOS FRUIT |
| 7.56 | 1 | FRIED CHICKEN SALAD |
| 7.7 | 0.59 | FRIENDS OF THE MEAL |
| 7.82 | 1 | FRIES ECO |
| 7.86 | 1 | FRIES 'N DELICIOUS |
| 8.16 | 0.65 | FRIED FOOD STEAKS |
| 8.97 | 1 | FRIED SHRIMP FRESH |
| 9 | 1 | FRIES OF GOOD! |
| 9.22 | 1 | FRIED CHICKEN FRESH TIME |
| 9.35 | 0.58 | FRIED CHICKEN BREAKFAST BOWL |
| 9.92 | 1 | FRNG DRIED FARM |
| 10.31 | 1 | FRIES PICTIVE FOODS |
| 11.09 | 1 | FRIES A LITTLE FARM |
| 11.67 | 1 | FRIAR FARMS FARM FRESH FRIES |
| 13.18 | 1 | FRIES COUNTY FROM STARTERS |
| 13.26 | 0.64 | FRIENDLY FOODS THE FRESH MARKE |

FIG. 15

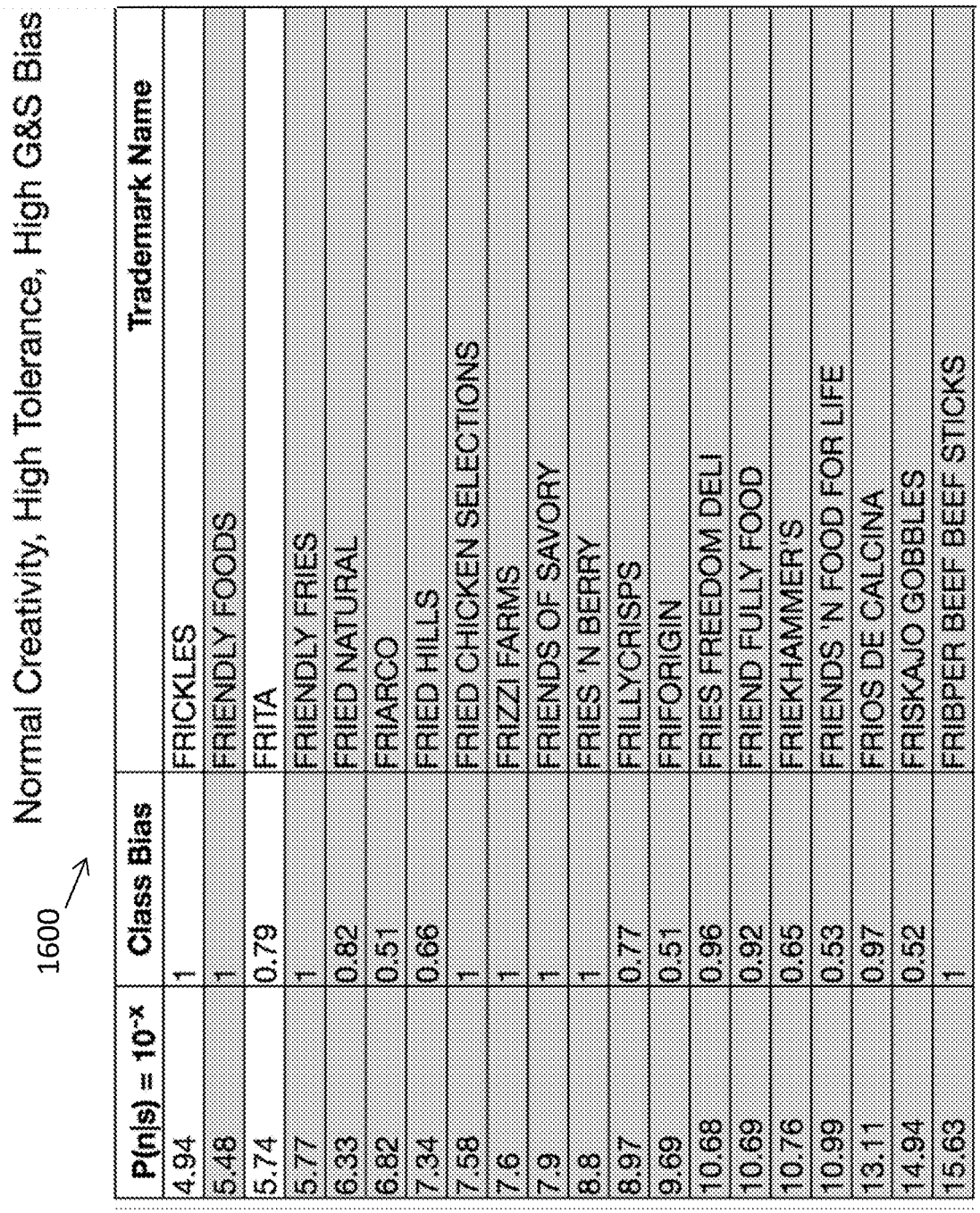

FIG. 16

Normal Creativity, High Tolerance, High G&S Bias

| P(n\|s) = 10^-x | Class Bias | Trademark Name |
|---|---|---|
| 4.94 | 1 | FRICKLES |
| 5.48 | 1 | FRIENDLY FOODS |
| 5.74 | 0.79 | FRITA |
| 5.77 | 1 | FRIENDLY FRIES |
| 6.33 | 0.82 | FRIED NATURAL |
| 6.82 | 0.51 | FRIARCO |
| 7.34 | 0.66 | FRIED HILLS |
| 7.58 | 1 | FRIED CHICKEN SELECTIONS |
| 7.6 | 1 | FRIZZI FARMS |
| 7.9 | 1 | FRIENDS OF SAVORY |
| 8.8 | 1 | FRIES 'N BERRY |
| 8.97 | 0.77 | FRILLYCRISPS |
| 9.69 | 0.51 | FRIFORIGIN |
| 10.68 | 0.96 | FRIES FREEDOM DELI |
| 10.69 | 0.92 | FRIEND FULLY FOOD |
| 10.76 | 0.65 | FRIEKHAMMER'S |
| 10.99 | 0.53 | FRIENDS 'N FOOD FOR LIFE |
| 13.11 | 0.97 | FRIOS DE CALOINA |
| 14.94 | 0.52 | FRISKAJO GOBBLES |
| 15.63 | 1 | FRIBPER BEEF BEEF STICKS |

Most Likely, Low Tolerance, Low G&S Bias

| $P(n|s) = 10^{-x}$ | Class Bias | Trademark Name |
|---|---|---|
| 4.72 | 0.11 | FRIENDLY |
| 4.89 | 0.24 | FRINKLES |
| 4.95 | 0.14 | FRIEND |
| 5 | 0.29 | FRIENDSHIP |
| 5.07 | 0.13 | FRIDAY |
| 5.11 | 0.13 | FRIENDS |
| 5.2 | 0.18 | FRI |
| 5.24 | 0.33 | FRISCH |
| 5.34 | 0.38 | FRIZZLERS |
| 5.35 | 0.04 | FRIELDS |
| 5.4 | 0.25 | FRIGO |
| 5.44 | 0.39 | FRINGS |
| 5.5 | 0.31 | FRIMA |
| 5.51 | 0.06 | FRIZZLER |
| 5.55 | 0.06 | FRIENDLYS |
| 5.56 | 0.02 | FRIENDI |
| 5.56 | 0.22 | FRIE |
| 5.58 | 0.32 | FRIO |
| 5.59 | 0.34 | FRICK |
| 5.61 | 0.12 | FRIZZLE |

FIG. 17

Low Creativity, Low Tolerance, Low G&S Bias

| $P(n\|s) = 10^{-x}$ | Class Bias | Trademark Name |
|---|---|---|
| 4.72 | 0.11 | FRIENDLY |
| 4.95 | 0.14 | FRIEND |
| 5.84 | 0.06 | FRIENDS OF AMERICA |
| 5.99 | 0.19 | FRIED KITCHEN |
| 6 | 0.37 | FRIANGLES |
| 6.59 | 0.43 | FRIED FOR LIFE |
| 6.82 | 0.09 | FRIENDS OF THE BEST |
| 7.46 | 0.08 | FRIENDS OF THE MORNING |
| 7.73 | 0.21 | FRIENDS OF SWEETNESS |
| 7.85 | 0.38 | FRIENDS OF THE FORK |
| 7.92 | 0.1 | FRIENDS OF FLAMINGO |
| 7.98 | 0.1 | FRIENDS OF THE HONEY |
| 8.01 | 0.12 | FRIENDS OF THE BORDER |
| 8.16 | 0.02 | FRIZZLE BUTTER |
| 8.21 | 0.06 | FRIENDS OF THE HERE |
| 8.86 | 0.03 | FRICKER BABY |
| 9.07 | 0.15 | FRIED BAGEL BAR |
| 9.07 | 0.23 | FRIES ON THE TRIP |
| 9.11 | 0.12 | FRIENDS OF PERFECT PRODUCTS |
| 9.56 | 0 | FRIENDS OF THE PRINTS |

FIG. 18

Normal Creativity, Low Tolerance, Low G&S Bias

| $P(n\|s) = 10^{-x}$ | Class Bias | Trademark Name |
|---|---|---|
| 5.11 | 0.13 | FRIENDS |
| 5.82 | 0.05 | FRIENDE |
| 6.27 | 0.06 | FRIEDLIFE |
| 6.42 | 0.09 | FRIESEE |
| 6.42 | 0.04 | FRISCAN |
| 6.62 | 0.16 | FRIANDI |
| 6.81 | 0.4 | FRILLY FLAVOR |
| 7.53 | 0.33 | FRIENDS OF THE ORIGINAL |
| 7.76 | 0.03 | FRISWITE |
| 8.59 | 0.09 | FRIEND NORTH |
| 8.61 | 0.17 | FRIENDSHIP PRODUCT |
| 8.74 | 0.35 | FRIED JAY |
| 9.05 | 0.08 | FRIED FLEXE |
| 9.05 | 0.23 | FRIENDS RAMEN |
| 9.25 | 0.34 | FRITH FRESH |
| 9.26 | 0.01 | FRILLS MARKETS |
| 9.45 | 0.45 | FRIED KURI |
| 9.67 | 0.11 | FRIB-TEND |
| 9.75 | 0.36 | FRI ZA BA |
| 9.87 | 0.01 | FRITEVMS |

FIG. 19

SYSTEMS AND METHODS FOR TRAINING AND EMPLOYING MACHINE LEARNING MODELS FOR UNIQUE STRING GENERATION AND PREDICTION

RELATED APPLICATIONS

The present application claims priority to and the benefit of U.S. Provisional Application No. 62/740,820, filed on Oct. 3, 2018, the disclosure of which is incorporated by reference herein in its entirety.

BACKGROUND

Unique string generation can be complex and can often require users to first specify a string and subsequently search a data repository including pre-existing strings to compare the specified string to the pre-existing string to determine uniqueness. If the string is determined to lack enough uniqueness users often have to repeat the entire process. Such a process can be time consuming and resource intensive.

SUMMARY

In accordance with embodiments of the present disclosure, a system, method, and non-transitory computer-readable medium for generating strings based on a seed string are disclosed.

In accordance with embodiments of the present disclosure, the method can include training a plurality of machine learning models, deriving a plurality of random walk models from the trained machine learning models, and receiving a seed string as an input to the plurality of random walk models. The method can also include iteratively generating, by each of the plurality of random walk models, one or more next characters for the seed string to generate at least one term from each of the random walk models, and outputting a ranked order for the at least one term to a graphical user interface.

In accordance with embodiments of the present disclosure, the non-transitory computer-readable medium stores instructions, wherein execution of the instructions by a processing device causes the processing device to implement embodiments of the method.

In accordance with embodiments of the present disclosure, the system can include a non-transitory computer-readable medium and a processing device. The non-transitory computer-readable medium stores training data. The processing device can be configured to train machine learning models using the training data, derive random walk models from the trained machine learning models, and receive a seed string as an input to the random walk models. The processing device can be further configured to iteratively generate, by each of the random walk models, one or more next characters for the seed string to generate at least one term from each of the random walk models, and output a ranked order for the at least one term generated by each of the random walk models to a graphical user interface.

In accordance with embodiments of the present disclosure, the processing device can be configured to determine a predicted class for the at least one term generated by each of the random walk models.

In accordance with embodiments of the present disclosure, training the plurality of machine learning algorithms can include identifying a data source including a plurality of terms, each of the plurality of terms being associated with at least one of a plurality of classifications; identifying a plurality of sets of training data from the data source, each of the plurality of sets of training data including a subset of terms for a different one of the plurality of classifications; and training each of the plurality of machine learning algorithms using a different one of the plurality of sets of training data to bias each of the plurality of machine learning algorithms to a different one of the classifications.

In accordance with embodiments of the present disclosure, iteratively generating one or more next characters for the one or more seed strings by (a) generating a probability distribution including a probability that characters from a set of characters should be a next character; (b) outputting, via the at least one of the plurality of random walk models, a first one of the characters as the next character after the start tag based on the probability distribution; and (c) repeating steps (a) and (b) until the next character output is an end tag.

In accordance with embodiments of the present disclosure, at least one of the plurality of machine learning algorithms is trained by: (a) executing the at least one of the plurality of machine learning algorithms to attempt to predict a next character in a term from a set of training data; (b) in response to the at least one of the plurality machine learning machine algorithms correctly predicted the next character of the term, maintaining current weights of the at least one of the plurality of machine learning algorithms; (c) in response to the at least one of the plurality of machine learning algorithms incorrectly predicting the next character of the term, modifying the current weights to adjust the at least one of the plurality of machine learning algorithms predicted outcome a next time an encountered scenario recurs; and (d) repeating steps a through c until the at least one of the plurality of machine learning algorithms has converged.

In accordance with embodiments of the present disclosure, variants of the at least one term can be generated, a similarity score can be generated for each of the variants, and each one of the variants can be selected or discarded based on the similarity score. At least one of the variants and at least one of determining a predicted class of the at least one of the variants or generating additional variants from the at least one of the variants can be performed.

In accordance with embodiments of the present disclosure, one or more descriptive terms are received from a user, one or more words that are semantically related to the one or more descriptive terms are identified, the one or more words are partitioned into parts for prefixes, suffixes, and infixes, and the one or more seed strings are generated based on the parts.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

In the drawings, like reference numerals refer to like parts throughout the various views of the non-limiting and non-exhaustive embodiments.

FIG. 10 illustrates an exemplary training process implemented in accordance with embodiments of the present disclosure.

FIG. 11 illustrates an exemplary term generation process in accordance with embodiments of the present disclosure.

FIGS. 14-19 illustrate outputs of the system for training a series of machine learning models and employing the trained machine learning models for unique string generation and predictive analysis of generated strings in accordance with embodiments of the present disclosure.

DETAILED DESCRIPTION

Exemplary embodiments of the present disclosure relate to training a series of machine learning models and employing the trained models for string generation and predictive analysis of generated strings.

In an example application, the systems and methods described herein can be utilized for trademark name generation and class uniqueness prediction, where the machine learning models can be trained and validated using registered trademark names from one or more trademark registers. The machine learning models for trademark name generation can be trained on a class-by-class basis such that a different model can be generated for each trademark class, where the trademark names generated by these machine learning models can be biased towards the registered trademarks within the class from which the machine learning models are trained. After the trademark names are generated, the systems and methods can perform an optimization by generating variants for the generated names based on a specific category or industry and/or can identify the classes each of the generated trademark names would likely be associated with and would likely not be associated with. The classes can be identified by processing each of the generated trademark names via a class predictor including machine learning models that have been trained on training data from a trademark register, where the training data is taken from each of the classes in the register.

Figure 1:
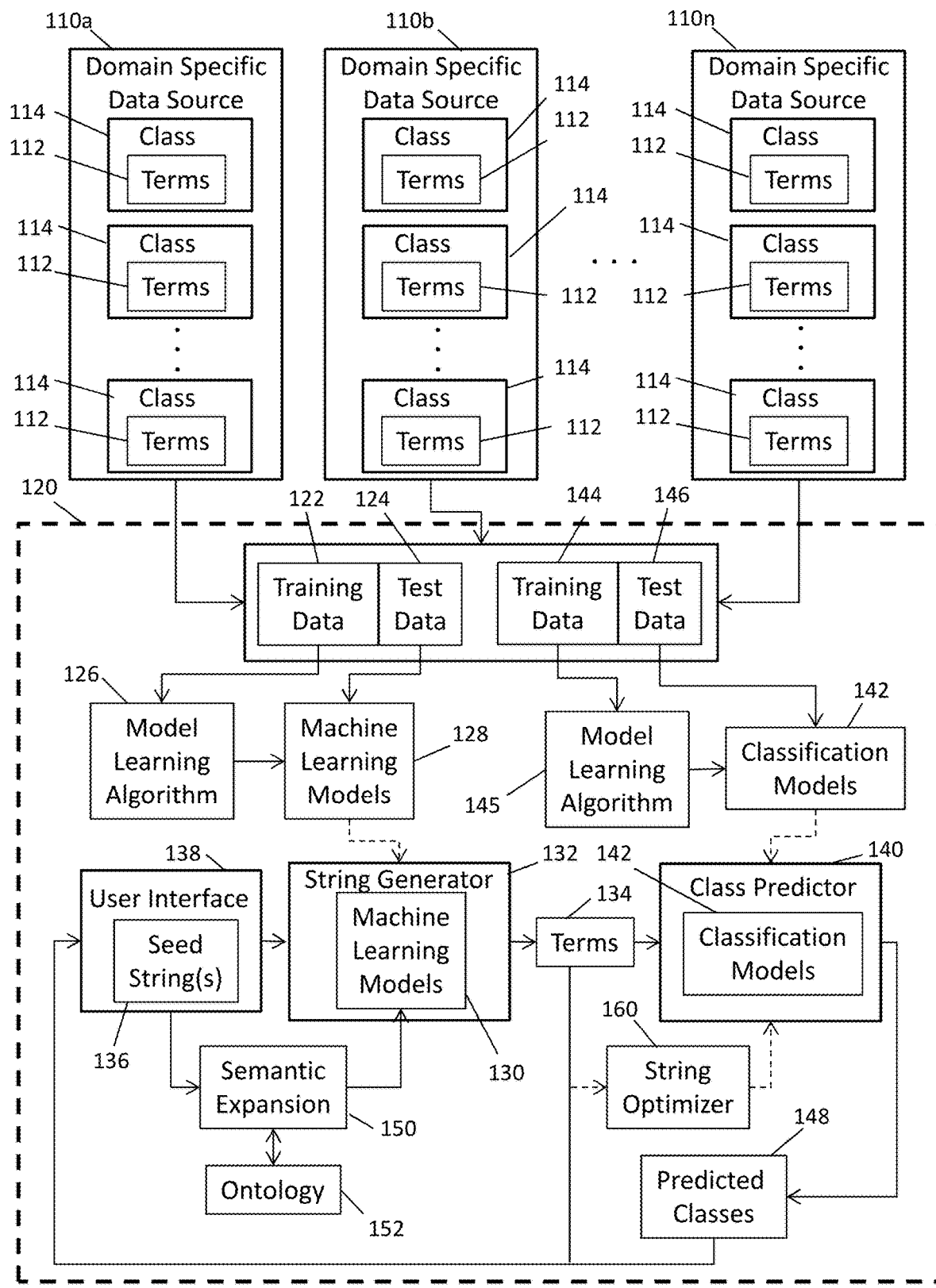
FIG. 1 is a block diagram of an environment for training a series of machine learning models and employing the trained machine learning models for unique string generation and predictive analysis of generated strings in accordance with embodiments of the present disclosure.

FIG. 1 is a block diagram of an exemplary environment 100 for training a series of machine learning models and employing the trained machine learning models for unique string generation and predictive analysis of generated strings.

The environment 100 can include domain-specific data sources 110a-n (e.g., one for each trademark register). Each domain-specific data source 110a-n can include a repository or database of terms 112 (e.g., registered trademarks) which can be classified as being associated with one or more classes 114 (e.g., trademark classes). Each of the terms 112 can be formed, for example, by one or more strings of alphanumeric characters. As a non-limiting example, as described herein, the terms 112 in the domain-specific data sources 110a-n can be registered trademarks and the classes 114 can correspond to goods/services classifications for the trademark names. Each domain-specific data source 110a-n can represent, for example, a different jurisdiction within which trademark names can be registered. As one example, the domain-specific data source 110a can be a database of trademarks registered in the United States Patent and Trademark Office. In some instances, one or more of the terms 112 stored in any one of the domain-specific data sources 110a-n can also be stored in other ones of the domain-specific data sources 110a-n; for example, where the same trademark name is registered in multiple jurisdictions. The classes 114 in the domain-specific data sources 110a-n can be mutually exclusive or one or more of the domain-specific data sources 110a-110n can include one or more of the same classes. For example, in one embodiment, the classes in the domain-specific data source 110a and the domain-specific data source 110b can be mutually exclusive, while at least some of the classes 114 in the domain-specific data source 110a and the domain-specific data source 110n can be the same.

A system 120 for training a series of machine learning models and employing the trained machine learning models for unique string generation and predictive analysis of generated strings can generate one or more sets of training data 122 and test data 124 from the domain-specific data sources 110a-n. As one example, a different set of training data 122 can be generated from each of the domain-specific data sources 110a-n and a different set of test data 124 can be generated from each of the domain-specific data sources 110a-n. As another example, a different set of training data 122 can be generated from each class of the domain-specific data sources and a different set of test data 124 can be generated from each class of the domain-specific data sources 110a-n. Each set of training data 122 and corresponding set of testing data 124 can be mutually exclusive such that there is no overlap between the set of training data and a corresponding set of test data 124.

As a non-limiting example, a set of training data can be generated from a first subset of the terms 112 included in a selected one of the classes 114 and a corresponding set of test data can be generated from a second, mutually exclusive, subset of the terms 112 included in the selected one of the classes 114. The system 120 can generate a set of training data 122 and a set of test data in this manner for each class in the domains-specific data source. For example, if there are forty-five (45) classes in the domain-specific data source 110a, the system 120 can generate forty-five (45) sets of training data (one for each class) and forty-five (45) corresponding sets of test data (one for each class). The system 120 can generate similar sets of training data and test data from the remaining domain-specific data sources 110b-n.

The sets of training data 112 can be input to a machine learning algorithm 126 to train sets of machine learning models 128 based on processing the sets of training data 122. Continuing with the example with respect to the training and testing data for the domain-specific data source 110a, a different machine learning model can be generated for each set of training data such that, for example, forty-five (45) different sets of training data 122 can be processed by the machine learning algorithm 126 to train forty-five (45) different machine learning models 128 (e.g., one for each class in the domain-specific data source 110a). The sets of training data 122 for the remaining domain-specific data sources 110b-n can be processed by the machine learning algorithm 126 to generate machine learning models for each of the sets of training data 122 of the remaining domain-specific data sources 110b-n. As non-limiting example, in one embodiment, the machine learning algorithm 126 can be a deep neural network machine learning algorithm. Embodiments of the deep neural network machine learning algorithm can use, for example, Long Short Term Memory (LSTM) layers.

In some embodiments, the machine learning algorithm 126 can include, for example, supervised learning algorithms, unsupervised learning algorithm, artificial neural network algorithms, association rule learning algorithms, hierarchical clustering algorithms, cluster analysis algorithms, outlier detection algorithms, semi-supervised learning algorithms, reinforcement learning algorithms and/or deep learning algorithms Examples of supervised learning algorithms can include, for example, AODE; Artificial neural network, such as Backpropagation, Autoencoders, Hopfield networks, Boltzmann machines, Restricted Boltzmann Machines, and/or Spiking neural networks; Bayesian statistics, such as Bayesian network and/or Bayesian knowledge base; Case-based reasoning; Gaussian process regression; Gene expression programming; Group method of data handling (GMDH); Inductive logic programming; Instance-based learning; Lazy learning; Learning Automata; Learning Vector Quantization; Logistic Model Tree; Minimum message length (decision trees, decision graphs, etc.), such as Nearest Neighbor algorithms and/or Analogical modeling; Probably approximately correct learning (PAC) learning; Ripple down rules, a knowledge acquisition methodology; Symbolic machine learning algorithms; Support vector machines; Random Forests; Ensembles of classifiers, such as Bootstrap aggregating (bagging) and/or Boosting (meta-algorithm); Ordinal classification; Information fuzzy networks (IFN); Conditional Random Field; ANOVA; Linear classifiers, such as Fisher's linear discriminant, Linear regression, Logistic regression, Multinomial logistic regression, Naive Bayes classifier, Perceptron, and/or Support vector machines; Quadratic classifiers; k-nearest neighbor; Boosting; Decision trees, such as C4.5, Random forests, ID3, CART, SLIQ, and/or SPRINT; Bayesian networks, such as Naive Bayes; and/or Hidden Markov models. Examples of unsupervised learning algorithms can include Expectation-maximization algorithm; Vector Quantization; Generative topographic map; and/or Information bottleneck method. Examples of artificial neural network can include Self-organizing maps. Examples of association rule learning algorithms can include Apriori algorithm; Eclat algorithm; and/or FP-growth algorithm. Examples of hierarchical clustering can include Single-linkage clustering and/or Conceptual clustering. Examples of cluster analysis can include K-means algorithm; Fuzzy clustering; DBSCAN; and/or OPTICS algorithm. Examples of outlier detection can include Local Outlier Factors. Examples of semi-supervised learning algorithms can include Generative models; Low-density separation; Graph-based methods; and/or Co-training. Examples of reinforcement learning algorithms can include Temporal difference learning; Q-learning; Learning Automata; and/or SARSA. Examples of deep learning algorithms can include Deep belief networks; Deep Boltzmann machines; Deep Convolutional neural networks; Deep Recurrent neural networks; and/or Hierarchical temporal memory.

A start and end tag can be added to each term (e.g., registered trademark name) in the training data. To train the models 128 using the machine learning algorithm 126, the system 120 can use a known seed string from each term in the training data. For example, a prefix substring of one of the terms in one of the sets of training data 122 can be input to the machine learning model and the machine learning model can be trained to iteratively predict the next character (s) of the term based on the seed string (e.g., the prefix substring). By processing all of the terms in the training data, the model can be trained to determine probability distributions for next characters in a string relative to previous or subsequent characters in the string. In one example, the next character can be selected from a set of alphanumeric characters, punctuation or special characters (e.g., ?, !, @, #, $, %, ^, &, *), a space, a start tag (<start>), an end tag (<end>). For a term having a length l, there are l+1 training cases, where a corpus of N terms having an average length l results in N*(l+1) training cases. The trained models 128 can be validated using the corresponding sets of test data 124.

Using the trained and validated models 128, the system 120 derives random walk models 130. For example, a different random walk model can be derived from each machine learning model generated from one of the forty-five (45) sets of training data (e.g., forty-five (45) random walk models 130 can be generated from forty-five (45) models 128 generated for the domain-specific data source according to one example). The random walk models 130 can be used by a string generator 132 of the system 120 to generate terms 134 (e.g., proposed/generated trademark names) in response to a user-specified seed string 136 input to the models 130.

The user-specified seed string 136 can be an empty string (i.e. no characters), can include one character, two characters, three characters, four characters, and so on, such that the user-specified seed string 136 can include zero to x characters, where x is any real integer, and/or can be or include a pattern, directive, or tag that indicates to the string generator 132 a processing direction with which to complete the string (e.g., left-to-right processing, right-to-left processing, or a combination of both). The string can include a directive or tag to indicate whether or not the generated term (e.g., trademark name) should contain multiple terms. For example, seed strings are BAM*, *DOL, *MIDO*, or BAM*<space>* that respectively will result in trademark names starting with BAM, ending with DOL, containing MIDO, or containing at least two (2) words, of which the first word starts with BAM and the second word starts as an empty string. In the preceding example, the "*" can be a directive or pattern to indicate that characters where and how characters should be added. Any combinations of alphanumeric characters including spaces and the wildcard denoted by the character "*" are possible. Other wildcards can be included in the seed string, e.g., a question mark "?" for one character and the like. The start can be added to the user-specified seed string 136 when it is input to the random walk models 130.

The terms (e.g., trademark names) generated by each one of the random walk models 130 can be biased towards the class (e.g., trademark class) for which the random walk model was trained. For example, a random walk model trained for a first class can generate terms from a seed string that are biased towards the terms in the first class. The user-specified seed string 136 can be processed twice by each random walk model 130. For example, in a first process, each random walk model 130 can process the user-specified seed string 136 to iteratively generate subsequent characters for the user-specified seed string 136 (e.g., left-to-right processing). In a second process, each random walk model 130 can process the user-specified seed string 136 to iteratively generate preceding characters for the user-specified seed string 136 (e.g., right-to-left processing). In some embodiments, left-to-right and right-to-left processing can be combined such that characters are added the beginning and end of the user-specified seed string. Each random walk model 130 can independently process the input user-specified string 136 to output a different term such that a pair of terms can be generated in response to an input user-specified string (e.g., one for the left-to-right processing, one for the right-to-left processing, and one for the combined left-to-right and right-to-left processing). The random walk models 130 can include a creativity factor which can be specified by a user (e.g., via user interface 138) or by the system 120 and can be implemented to vary the next and/or preceding character generation. To generate the next and/or preceding character in response to the user-specified seed string 136, the random walk model of the string generator 132 outputs a probability distribution over each possible next and/or preceding character and selects a character where the character with the highest probability in the distribution has the greatest chance of becoming the next and/or preceding character, the character with the lowest probability, the character with a probability closest to the mean or median of the distribution, the character chosen at random from the set of characters, the character chosen at random from the set of characters where characters in the set can be weighted based on the probabilities to make them more or less likely to be chosen, a combination of any of the above, and/or using any other suitable parameters.

The creativity factor influences the random walk models. If the creativity factor is set to 0.0, the most likely next character is always chosen according to the statistics trained by the machine learning algorithm (e.g., the character with the highest probability in the probability distribution). On the other hand, if the creativity factor is set to 1.0, a purely random character from the set of characters (a set of alphanumeric characters, punctuation or special characters, a space, a start tag, an end tag) is chosen and the statistics determined by the machine learning algorithm are ignored. For a creativity factor value in between 0.0 and 1.0, the choice of the next character is influenced by the size of the creativity factor. The smaller the creativity factor is, the higher the chance the next character that is selected is based on the statistics learned. The larger the creativity factor is, the more random the choice of the next character is and the less influence the learned statistics have.

Each next character added to the user-specified seed string by the random walk model can be selected from a set of characters including alphanumeric characters, punctuation or special characters (e.g., ?, !, @, #, $, %, ^, &, *), a space, a start tag (<start>), an end tag (<end>). As described herein, the random walk model can generate a probability distribution for the next character, where each character in the set is assigned a probability. The next character selected by the random walk model can correspond to the character in the set that has the highest probability. When the end tag <end> has the highest probability, the random walk model can select the end tag and the string generation process is complete.

The string generator 132, via execution of the machine learning models 130, can output the likelihood (a probability value) that each of the terms generated by the string generator 132 would have been generated, and can rank the generated terms based on the likelihood, where more likely terms are assumed to be closer to human perception as preferably terms.

The user-specified seed string 136 can be input by a user via a user interface 138. Additionally, or in the alternative, the user can enter a requested class for the term to be generated by the system 120 and/or a description (e.g., a goods/services description—a similar system could be trained to provide a generator for each type of goods/service or cluster of related goods/services). The user interface 138 can be programmed and/or configured to provide one or more graphical user interfaces (GUIs) through which users of the system 120 can interact with the system 120. The GUIs can be rendered on display devices and can include data output areas to display information to the users output by the system as well as data entry areas to receive information from the users as inputs to the system 120. For example, data output areas of the GUIs can output information associated with generated terms and predicted classes to the users via the data outputs and the data entry areas of the GUIs can receive, for example, information associated with user-specified seed strings. Some examples of data output areas can include, but are not limited to text, graphics (e.g., graphs, maps, images, and the like), and/or any other suitable data output areas. Some examples of data entry fields can include, but are not limited to text boxes, check boxes, buttons, dropdown menus, and/or any other suitable data entry fields.

The terms 134 generated by the string generator 132 can be subsequently processed by a class predictor 140 of the system 120. The class predictor 140 can utilize a set of classification machine learning models 142 that are separately and distinctly derived from different sets of training and test data than the training and test data 122 and 124 utilized to form the random walk models 130. The classification models 142 can be trained using sets of training data 144 and corresponding sets of test data 146. The sets of training data 144 can be formed from the corpus of data in each domain-specific data source 110*a-n*. As one example, one set of training data 144 can include terms from the domain-specific data source 110*a* that includes terms from each class in the domain-specific data source 110*a*. Likewise, a corresponding one of the sets of test data 146 can include terms from the domain-specific data source 110*a* that includes terms from each class in the domain-specific data source 110*a*, where the set of training data and the corresponding set of test data are mutually exclusive. The sets of training data 144 can be processed by a machine learning algorithm 145 to train the classification models 142.

As an example, one of the classification models 142 can be generated for each of the domain-specific data sources 110*a-n*.

In exemplary embodiments, the machine learning algorithm 145 can include, for example, supervised learning algorithms, unsupervised learning algorithm, artificial neural network algorithms, association rule learning algorithms, hierarchical clustering algorithms, cluster analysis algorithms, outlier detection algorithms, semi-supervised learning algorithms, reinforcement learning algorithms and/or deep learning algorithms Examples of supervised learning algorithms can include, for example, AODE; Artificial neural network, such as Backpropagation, Autoencoders, Hopfield networks, Boltzmann machines, Restricted Boltzmann Machines, and/or Spiking neural networks; Bayesian statistics, such as Bayesian network and/or Bayesian knowledge base; Case-based reasoning; Gaussian process regression; Gene expression programming; Group method of data handling (GMDH); Inductive logic programming; Instance-based learning; Lazy learning; Learning Automata; Learning Vector Quantization; Logistic Model Tree; Minimum message length (decision trees, decision graphs, etc.), such as Nearest Neighbor algorithms and/or Analogical modeling; Probably approximately correct learning (PAC) learning; Ripple down rules, a knowledge acquisition methodology; Symbolic machine learning algorithms; Support vector machines; Random Forests; Ensembles of classifiers, such as Bootstrap aggregating (bagging) and/or Boosting (meta-algorithm); Ordinal classification; Information fuzzy networks (IFN); Conditional Random Field; ANOVA; Linear classifiers, such as Fisher's linear discriminant, Linear regression, Logistic regression, Multinomial logistic regression, Naive Bayes classifier, Perceptron, and/or Support vector machines; Quadratic classifiers; k-nearest neighbor; Boosting; Decision trees, such as C4.5, Random forests, ID3, CART, SLIQ, and/or SPRINT; Bayesian networks, such as Naive Bayes; and/or Hidden Markov models. Examples of unsupervised learning algorithms can include Expectation-maximization algorithm; Vector Quantization; Generative topographic map; and/or Information bottleneck method. Examples of artificial neural network can include Self-organizing maps. Examples of association rule learning algorithms can include Apriori algorithm; Eclat algorithm; and/or FP-growth algorithm. Examples of hierarchical clustering can include Single-linkage clustering and/or Conceptual clustering. Examples of cluster analysis can include K-means algorithm; Fuzzy clustering; DBSCAN; and/or OPTICS algorithm. Examples of outlier detection can include Local Outlier Factors. Examples of semi-supervised learning algorithms can include Generative models; Low-density separation; Graph-based methods; and/or Co-training. Examples of reinforcement learning algorithms can include Temporal difference learning; Q-learning; Learning Automata; and/or SARSA. Examples of deep learning algorithms can include Deep belief networks; Deep Boltzmann machines; Deep Convolutional neural networks; Deep Recurrent neural networks; and/or Hierarchical temporal memory.

The trained classification models 142 can be validated using the corresponding sets of test data 146. The trained and validated classification models can be multi-class classification models, where a generated term output by the string generator 132 can be associated with more than one class by the class predictor 140 by each of the trained and validated classification models 142. For example, the class predictor 140 can associate one or more classes (i.e. predicted classes 148) with the terms generated by the string generator 132 such that given a term generated by one of the random walk models 130, one of the trained classification models 142 can output a distribution indicating whether the generated term would or would not be associated with each class for the domain-specific data source from which the one of the trained classification models was trained. The classification models 142 can determine whether or not a generated term would be associated with a class based on a probability distribution generated by the classification models 142.

The rankings assigned to the generated terms by the string generator 132 can be refined based on the output of the class predictor. For example, a generated term for which the class requested is also observed to be the class the generated term is predicted to be associated with can be determined to be a better result for that class than those generated terms that were not predicted to be associated with the class.

In some embodiments, a user can input goods/services to be covered by the name(s) generated or other information via the user interface 138 and before the seed string is input to the string generator 132 or in parallel to the seed string being input to the string generator, a semantic expander 150 can receive the seed string, goods/services, and/or other information to identify semantically related words that can also be used as seed strings to be input to string generator 132. The semantic expander 150 can utilize one or more repositories of concepts, such as ontology 152. In a non-limiting example, the ontology 152 can be a natural language ontology, a goods/services ontology, and the like. The ontology 152 can be utilized by the semantic expander 150 to identify semantically related words to user-specified seed strings input to the user interface 138 by the user in a description field (e.g., for a goods/services description). As one example, a natural language ontology can be utilized by the semantic expander to identify strings that are semantically related to the strings specified by a user. As another example, a goods/services ontology can be utilized by the semantic expander to identify goods/services that are semantically related to the goods/services specified by a user. The ontology can include terms (e.g., the goods/services ontology can include term, such as common terms for goods and services) and can be structured such that semantically related terms are linked or otherwise associated with each other in the ontology. When one or more strings 136 specified in the user interface 138 are compared against the strings in the ontology 152, the ontology 152 can map the strings 136 to their semantically related strings, and the semantic expander 150 can input the semantically related strings into the string generator 132 to generate one or more terms as described herein for each of the output by the semantic expander 150.

The concepts stored in the ontology 152 can include features, such as a unique name and a list of natural language terms that correspond to the concept. This allows the semantic expander 150 to map individual strings or sequences of strings onto a set of recognized concepts. For example, for a given concept, the semantic expander 150 can identify synonyms, near synonyms, hyponyms, hypernyms, and/or other suitable natural language terms that can be expressed as being semantically related.

As one example, the user may specify an empty string for the seed string and specify a term in the description field of the user interface 138. The semantic expander 150 can identify synonyms, near synonyms, hyponyms, hypernyms, and/or other suitable natural language terms that can be expressed as being semantically related. For example, if the user enters "DRONE" in the description field, the semantic expander can identify "HELICOPTER", "UAV", and "AERO" as being semantically related to the string "DRONE". These semantically related strings can be input to the string generator 132 as seed strings for processing with machine learning models 130.

To enhance string generation using the string generator 132, the semantic expander 150 can input portions of the semantically related words into the string generator 132. For example, the semantic expander 150 can partition the words into different sized strings and can submit one or more of the different sized strings into the string generator as separate and distinct seed strings. In some embodiments, the semantically related words can be partitioned in prefixes, infixes, and suffixes and one or more of the prefixes, infixes, and/or suffixes can be input to the string generator 150 as seed strings.

In some embodiments, the terms 134 generated by the string generator 132 can be input to a string optimizer 160 before being input to the class predictor 140. For example, for terms generated by the string generator 132 that are specific to a particular category or industry, the string optimizer can optimize the terms 134 by generating one or more variants of the terms 134. The string optimizer 160 can replace the terms 134 with one or more variants that reduce a similarity compared to pre-existing names (e.g., registered trademarks). The variants of the terms 134 can be generated by the string optimizer 160 by using one or more of the following approaches: swapping a character within the term/string; swapping consonants and vowels within the term/string; replacing a character with another random character in the term/string; replacing a vowel with another random vowel in the term/string; replacing either a consonant or a vowel with another random consonant or vowel in the term/string; combining both swapping and replacing of characters in the term/string; changing, adding, or dropping a random character in the term/string; and/or swapping and replacing common substrings of a generated term that matches with a similar pre-existing generated name.

The variants of the terms 134 are evaluated by the string optimizer using a given similarity measure on a given set of pre-existing names. For each of the evaluated terms, a set of variants is generated. These variants are evaluated using the given similarity measure for the given set of pre-existing names to ensure that the distinctiveness of the variant(s) improve as compared to the terms 134, as well as based on a probability of the variant(s) being generated as term(s) specific to a specified category or industry, which can ensure that the variant(s) still look like term(s) that would be used for the specified category or industry. The similarity measure and probability can be converted in scores, and based on these scores, the string optimizer 160 can select variants that have acceptable scores and can discard variants with unacceptable scores. The selected variants are used as input to the string optimizer 160 for a next iteration of optimization by the string optimizer. The string optimization process can stop after a specified number of iteration or when no additional variants are generated that have similarity scores that are lower than a lowest similarity score of a previously generated variant/term.

Figure 2:
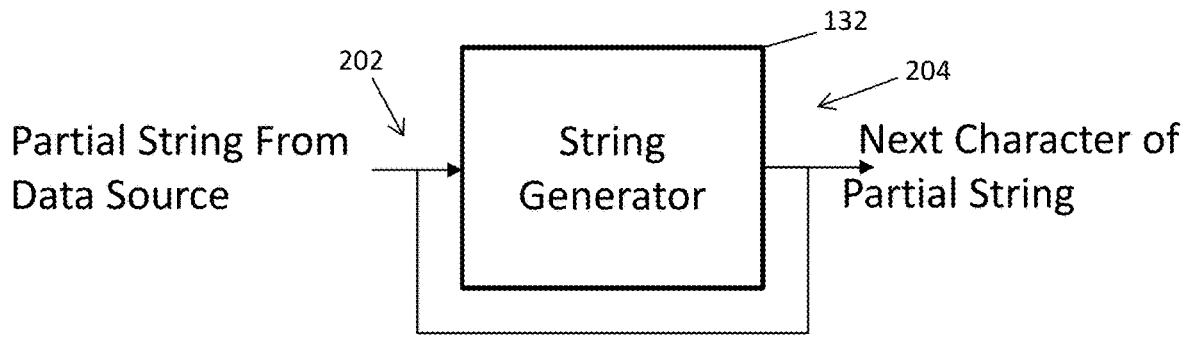
FIG. 2 is a block diagram illustrating a string generator in accordance with embodiments of the present disclosure.

FIG. 2 is a block diagram illustrating an embodiment of the string generator 132 including the trained and validated random walk machine learning models 130 in accordance with embodiments of the present disclosure. As shown in FIG. 2, the string generator 132 can receive a partial string 202 as an input and can generate a next or previous character 204 for the partial string 202 as an output. The process can include a feedback loop in which the output of the string generator is fed back as an input to the string generator 132 for the next iteration. In the next iteration, the string generator 132 generates the next character. The iterative process continues until the model 130 determines that the next character to be added to the end string is the end tag <end>, after which the model determines that the term generated by the string generator 132 is complete.

Figure 3:
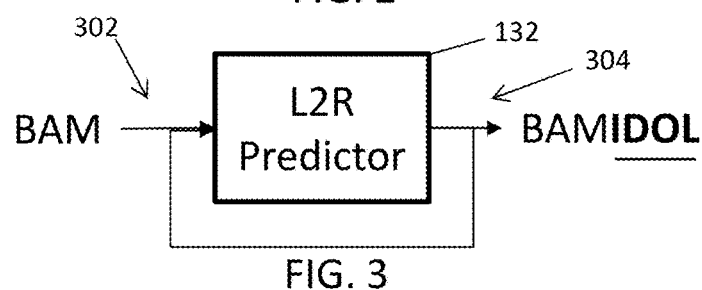
FIG. 3 is a block diagram illustrating string generation with a user-specified seed string using left-to-right processing in accordance with embodiments.

FIG. 3 is a block diagram illustrating string generation by an embodiment of the string generator 132 with a user-specified seed string 302 using left-to-right processing in accordance with exemplary embodiments. As shown in FIG. 3, the user-specified seed string 302 can be "BAM". The string generator 132 can receive the user-specified seed string 302, and can execute one of the random walk models using left-to-right processing to iteratively generate next characters for the user-specified seed string at output 304 using the feedback loop as described with respect to FIG. 2. For example, after each iteration of the process a character can be added to the end of the seed string and the next character can be determined based on the previous character added to the seed string and/or each of the characters now included in the seed string. The string generator 132 can select the next character based on an output of the random walk model. The next character that is selected and output by the random walk model can be based on one or more selection parameters. For example, the random walk model can generate a probability distribution generated for each of a set of characters (e.g., alphabet and/or numbers from 0-9) and can select the character having the highest probability in the distribution, the character having the lowest probability, the character having a probability closest to the mean or median of the distribution, the character chosen at random from the set of characters, the character chosen at random from the set of characters where characters in the set can be weighted based on the probabilities to make them more or less likely to be chosen, a combination of any of the above, and/or using any other suitable selection parameters. The selection parameters used for each iteration of the character selection can be fixed or varied. Varying the selection parameters that are used can facilitate the generation of string with more randomness then if the selection parameter was fixed. The selection parameters can be varied randomly for each iteration of character selection. The probability distribution can be biased based on the class from which the model being executed with derived. In the present example, the string generator appends an "I" to the seed string in the first iteration, appends a "D" to the seed string in the second iteration, appends an "O" to the seed string in the third iteration, and appends an "L" to the seed string in the fourth iteration. In the fifth iteration, the string generator 132 determines that the next character to be added to the seed string is the end tag <end>, and determines that the term "BAMIDOL" generated by the string generator 132 is complete.

Figure 4:
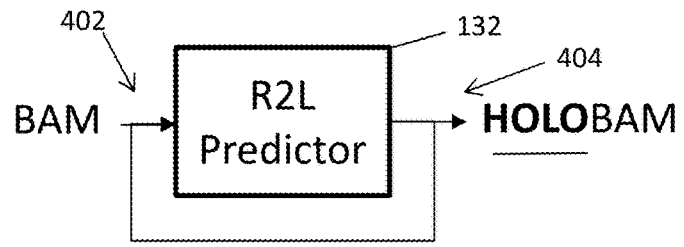
FIG. 4 is a block diagram illustrating string generation with a user-specified seed string using right-to-left processing in accordance with exemplary embodiments.

FIG. 4 is a block diagram illustrating string generation by an embodiment of the string generator 132 with a user-specified seed string 402 using right-to-left processing in accordance with exemplary embodiments. As shown in FIG. 4, the user-specified seed string 402 can be "BAM". The string generator 132 can receive the user-specified seed string 402, and can execute one of the random walk models using right-to-left processing to iteratively generate previous characters for the user-specified seed string at output 404 using the feedback loop as described with respect to FIG. 2. For example, after each iteration of the process a character can be prepended to the beginning of the seed string and the next character to be prepended can be determined based on the last character prepended to the seed string and/or each of the characters now included in the seed string. The string generator 132 can select the next character to prepend based on one or selection parameters utilized by the random walk model for a set of characters (e.g., alphabet and/or numbers from 0-9). The probability distribution can be biased based on the class from which the model being executed with derived. In the present example, the string generator prepends an "O" to the seed string in the first iteration, prepends an "L" to the seed string in the second iteration, prepends an "O" to the seed string in the third iteration, and prepends an "H" to the seed string in the fourth iteration. In the fifth iteration, the string generator 132 determines that the next character to be added to the seed string is the start tag <start>, and determines that the term "HOLOBAM" generated by the string generator 132 is complete.

Figure 5:
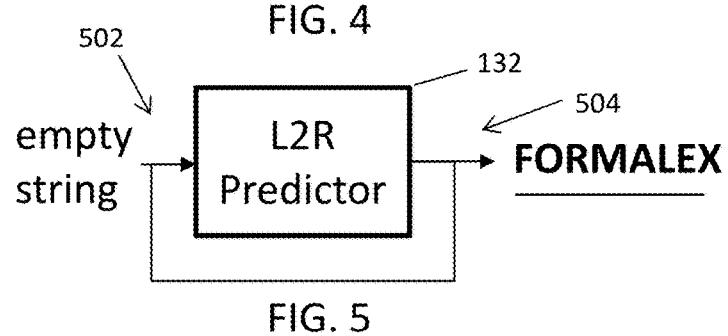
FIG. 5 is a block diagram illustrating string generation wherein a user-specified seed string is an empty string in accordance with exemplary embodiments.

FIG. 5 is a block diagram illustrating string generation with an embodiment of the string generator 132 wherein a user-specified seed string is an empty string in accordance with exemplary embodiments. As shown in FIG. 5, the string generator 132 can receive the empty string 502, and can execute one of the random walk models using left-to-right processing (or right-to-left processing) to iteratively generate characters for the empty string at the output 504 using the feedback loop as described with respect to FIG. 2. For example, after each iteration of the process a character can be appended to the end of the seed string and the next character to be appended can be determined based on the last character prepended to the seed string and/or each of the characters now included in the seed string. The string generator 132 can select the first character and each next character to append based on a probability distribution generated by the random walk model for each of a set of characters (e.g., alphabet and/or numbers from 0-9) and can select the character having the highest probability in the distribution. The probability distribution can be biased based on the class from which the model being executed with derived. In the present example, the string generator 132 generates an "F as the first character, appends an "O" to the seed string in the second iteration, appends a "R" to the seed string in the third iteration, appends a "M" to the seed string in the fourth iteration, appends an "A" to the seed string in the fifth iteration, appends a "L" to the seed string in the sixth iteration, appends an "E" to the seed string in the seventh iteration, and appends an "X" to the seed string in the eighth iteration. In the ninth iteration, the string generator 132 determines that the next character to be added to the seed string is the end tag <end>, and determines that the term "FORMOLEX" generated by the string generator 132 is complete.

Figure 6:
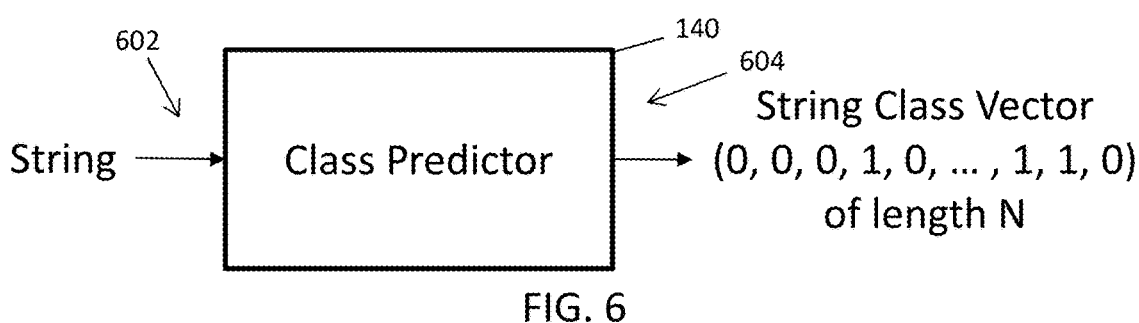
FIG. 6 is a block diagram of illustrating class prediction for a generated term using a class predictor in accordance with embodiments of the present disclosure.

FIG. 6 is a block diagram of illustrating class prediction for a generated term in accordance with embodiments of the present disclosure. As shown in FIG. 6, an embodiment of the class predictor 140 can receive at as an input 602 a generated string output by the string generator. The class predictor 140 can execute a class prediction model associated with a domain-specific data source. Based on the execution of the class predication model, the class predictor 140 can output 604 a string class vector of length Y, where Y equals the total number of class defined in the domain-specific data source (e.g., Y=45, where the domain-specific data source includes 45 classes). The vector can include zeroes and ones, where a zero indicates that the string would not likely be associated with the class as decided by the class predictor and a one indicates that the string would like to associated with the class. A position of the zero and ones in the vector can be mapped to the classes in the domain-specific data source.

Figure 7:
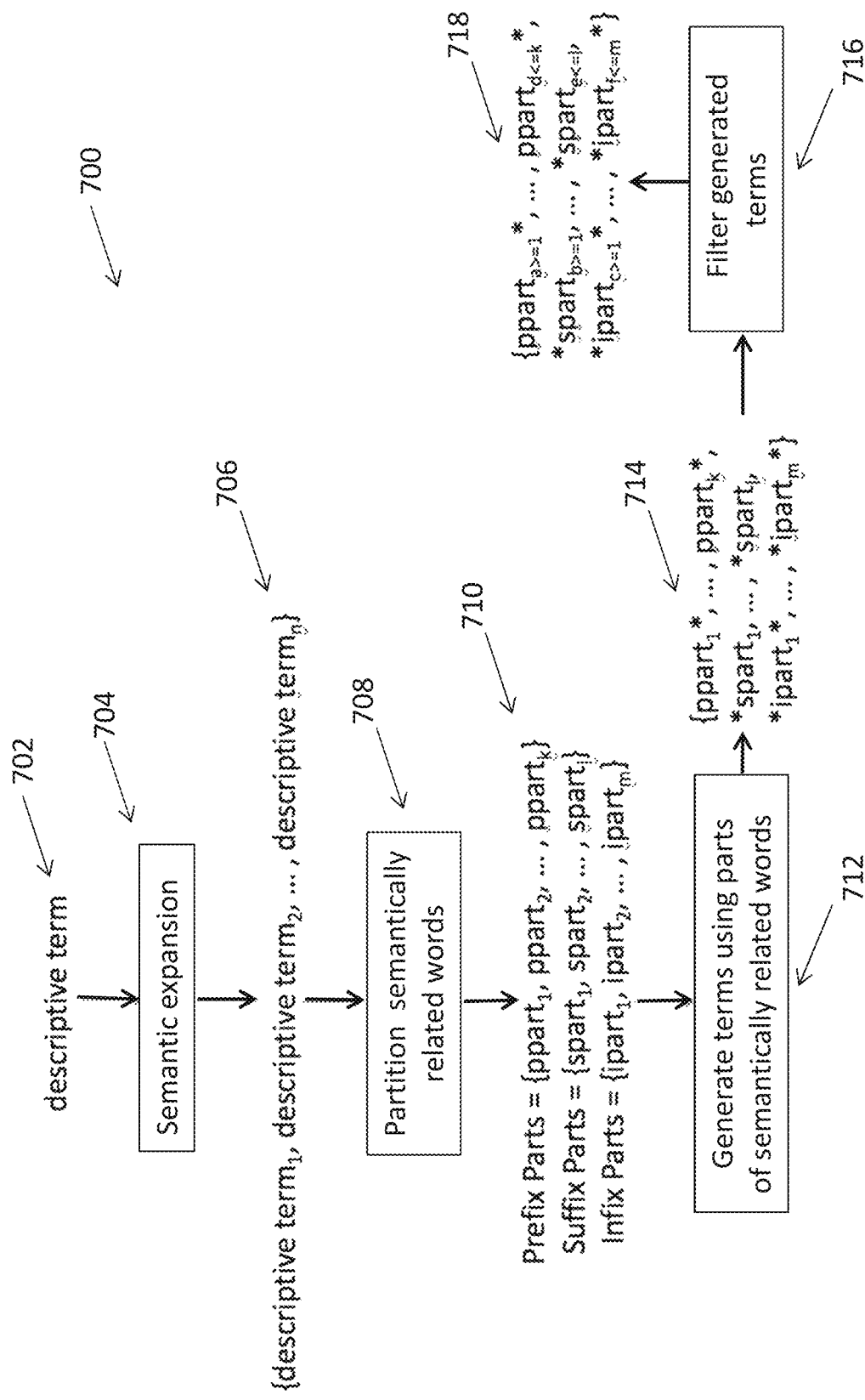
FIG. 7 is a flowchart illustrating an exemplary process performed by an embodiment of the semantic expander in accordance with embodiments of the present disclosure.

FIG. 7 is a flowchart illustrating an exemplary process 700 performed by an embodiment of the semantic expander 150 and an embodiment of the string generator 132 in accordance with embodiments of the present disclosure. As shown in FIG. 7, a descriptive term 702 is received by the semantic expander, which performs semantic expansion 704 of the descriptive term 702 into a set of descriptive terms 706 including semantically related words. The semantic expander partitions the semantically related words 708 in the set of descriptive terms 706 into parts 710 for prefixes, suffixes, and infixes. At step 712, the parts of the semantically related words are submitted to the string generator, which generates and outputs terms 714 by completing the parts of the semantically related words 712 using the random walk models. The terms 714 are then filtered at step 716 and a subset 718 of the terms 714 are output (e.g., for string optimization, ranking, and/or class prediction).

Figure 8:
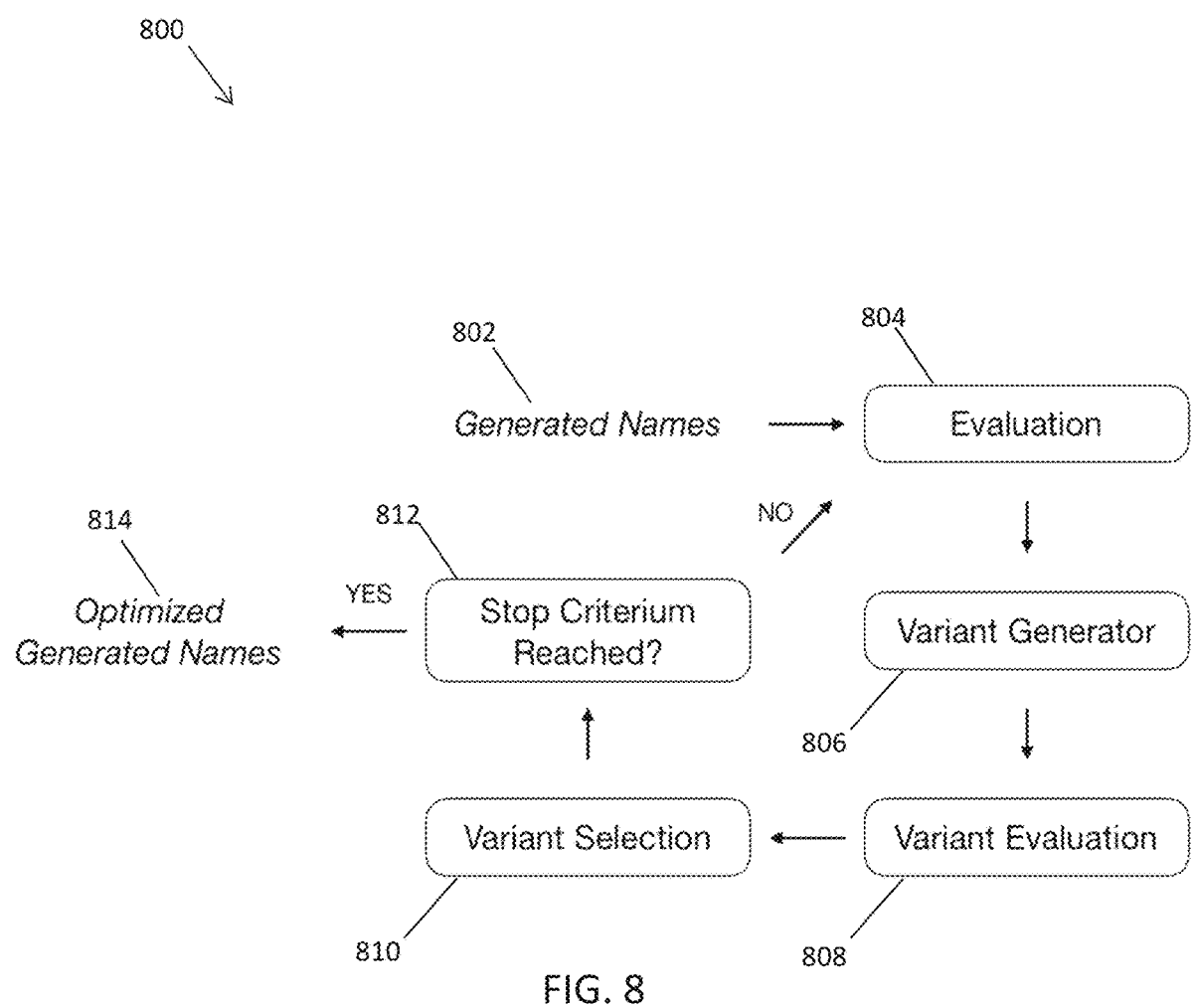
FIG. 8 is a flowchart illustrating an exemplary process performed by an embodiment of the string optimizer in accordance with embodiments of the present disclosure.

FIG. 8A is a flowchart illustrating an exemplary process 800 performed by an embodiment of the string optimizer 160 in accordance with embodiments of the present disclosure. Generated names/strings 802 are evaluated at step 804 and submitted to variant generator 806, which generates variants of the generated names. The variants are evaluated at step 808 and at step 810 variant selection occurs. During variant selection, the variants are scored and those variants that satisfy score thresholds are selected. Variants that are not selected are discarded. At step 812, the selected variants are compared to stop criteria, where, if a selected variant satisfies the stop criteria it is output as an optimized generated name 814. The selected variants are submitted go through the process in a subsequent iteration. That is, selected variants can be evaluated and further variants can be generated from the selected variants. The further variants can be selected or discarded and the selected further variants can be output and/or fed back into the process to generate still further variants in a subsequent iteration of the process 800. The process 800 can be configured to be performed for a specified number of iterations and/or until a specified criteria is satisfied, such as when no additional names are generated from the variants in a given iteration that have similarity scores lower than the currently lowest similarity score associated the names generated by the process 800.

In exemplary embodiments, the variants can be generated by swapping a character within the term/string; swapping consonants and vowels within the term/string; replacing a character with another random character in the term/string; replacing a vowel with another random vowel in the term/string; replacing either a consonant or a vowel with another random consonant or vowel in the term/string; combining both swapping and replacing of characters in the term/string; changing, adding, or dropping a random character in the term/string; and/or swapping and replacing common substrings of a generated string that matches with a similar pre-existing generated name. These approaches can be used independently all together, or in any combination to generate variants.

As one example, the string optimizer 160 can generate variants by swapping characters of a generated term one character at a time to create variants. For example, a generated term can be "BAMIDOL" and the string optimizer 160 can create variants by swapping one character at a time to create, for example, "BAMDIOL", where the "I" and the "D" are swapped, "BAMODIL", where the "O" and "I" are swapped, "BAMILOD", where the "L" and "D" are swapped.

As another example, the string optimizer 160 can swap consonants and vowels in a generated term to create variants. Using this approach, the string optimizer 160 can, for example, swap a consonant in a generated term with the next consonant and swap a vowel with the next vowel. For example, a generated term can be "BAMIDOL" and the string optimizer can create variants "BAMODIL" where the vowels "I" and "O" are swapped, "BAMILOD", where the consonants "L" and "D" are swapped.

As another example, the string optimizer 160 can randomly replace characters in a generated term to create variants. For example, a generated term can be "BAMIDOL" and the string optimizer 160 can create variants "BAMIDOZ" where the "L" is replaced with a "Z", "BAMIDON", where the "L" is replaced with an "N", "BAMIROL", where the "D" is replaced with an "R", "BAMIDEL", where the "O" is replaced with an "E".

As another example, the string optimizer 160 can randomly replace vowels in a generated term to create variants. For example, a generated term can be "BAMIDOL" and the string optimizer 160 can create variants "BAMYDOL" where the "I" is replaced with a "Y", "BAMEDOL", where the "I" is replaced with an "E", "BAMUDOL", where the "I" is replaced with a "U", "BAMIDYL", where the "O" is replaced with a "Y".

As another example, the string optimizer 160 can randomly replace vowels and/or consonants in a generated term to create variants. For example, a generated term can be "BAMIDOL" and the string optimizer 160 can create variants "BAMISOL" where the "D" is replaced with an "S", "BAMIROL", where the "D" is replaced with an "R", "BAMIDOX", where the "L" is replaced with an "X".

As another example, the string optimizer 160 can swap and replace consonants and vowels. This approach can combine swapping consonants and vowels and replacing consonants and vowels to create a variant. Variants can be created by randomly either swapping or replacing a vowel with another vowel or a consonant with another consonant in place. For example, a generated term can be "BAMIDOL" and the string optimizer 160 can create variants "BAMIDAL" where the "O" is replaced with an "A", "BAMYDOL" where the "I" is replaced with a "Y".

As another example, the string optimizer 160 can change, add, drop characters in a generated term to create variants. This approach generates variations by either changing a character, adding a character or dropping a character from the string/term. For example, a generated term can be "BAMIDOL" and the string optimizer 160 can create variants "BAMIXOL" where the "D" is changed an "X", "BAMNIDOL" where the "N" is added, "BAMIDROL" where the "R" is added, "BABIDOL" where the second "B" is added, BAMDOL where the "I" is dropped, "BAMIOL" where the "D is dropped.

As another example, the string optimizer 160 can swap a sub-string in a generated term to create variants. Using this approach, the generated term/string is compared with its most similar pre-existing name (e.g., registered trademark) to identify a common substring (part of string where both the strings match). This common substring in the generated term can be replaced by a randomly generated substring which is generated by using the above-mentioned approaches (e.g., swap and replace consonants and vowels) to create variants while the remaining portion of the string/term remains unchanged. For example, a generated term can be "BAMIDOL" and the string optimizer can generate a list of words by substituting a common substring of BAMIDOL determined to be most similar to a pre-existing name. For example it can be determined that the pre-existing name "ZAMADOL" is the most similar (e.g., based on a similarity measure) to BAMIDOL. The string optimizer 160 can determine that the substring "DOL" is a common substring between the two terms and can randomly swap or replace a character with another character in the common substring to create variants of the BAMIDOL. For example, the common substring "DOL" in the generated term "BAMIDOL" and "ZAMADOL" can be identified by the string optimizer and the string optimizer 160 can create variants "BAMIDOL" where the "DOL" is changed a "DOH", "BAMNIDUL" where the "DOL" is changed to "DUL", "BABIDOF" where the "DOL" is changed to "DOF".

FIG. 8B show an embodiment of the process 800 in which the sting optimizer 160 is configured to optimize a generated term (e.g., increase uniqueness while retaining the phonetic appearance of the generated term) for a specified industry, which in this example is specified to be the pharmaceutical industry, where a Phonetic and Orthographic Computer Analysis ("POCA") score is used to determine a similarity between terms. The string optimizer 160 can reduce the POCA score associated with a generated term by generating variants of the term to improve uniqueness (e.g., the variants can be derived to be less similar to the other pre-existing or registered trademarks). In the present example, the generated term that is initially input to the string optimizer can be "BAMIDOL". The string optimizer can evaluate BAMIDOL to generate a similarity score (e.g., a POCA score when the industry is the pharmaceutical industry) to identify a pre-existing registered trademark, "ZAMADOL" that is the best match for BAMIDOL based on the similarity score.

After BAMIDOL is evaluated, the variant generator can generate variants, such as "PAMIDOL", "BAMIDOO", based on "BAMIDOL" and using one more of the variant generation approaches described herein. The generated variants are evaluated to generate both a similarity score (e.g., the POCA score when the industry is the pharmaceutical industry) and a negative log likelihood (NLL) score (which in some embodiments can be based on the similarity score) for each of the generated variants, and to identify the pre-existing registered trademark that best matches each of the variants. The values of the similarity score and the NLL score of each of the generated variants are compared to a selection criteria to determine whether to select or discard the variants. In the present non-example, the selection criteria can be a similarity score that is lower than seventy and a NLL score that is lower than ten such that variants with a similarity score above seventy or above ten are discarded and variants with a similarity score below seventy and an NLL score below 10 are selected. While the present example uses specified quantities for illustrative purposes, exemplary embodiments of the present disclosure can use different values for the selection criteria.

The selected variants, in this example "BAMIDOO", are then compared to a stop criteria. Satisfaction of the stop criteria results in the selected variant being kept for subsequent processing (e.g., by the class predictor 140). The process can be iterative such that the selected variants (e.g., "BAMIDOO") can also be processed to be evaluated, generate variants for selection and outputting for further processing. For example, the process can be perform multiple iterations until, for example, a specified number of iterations have been performed and/or until no additional variants are generated that have similarity scores lower than the currently lowest similarity score associated the names generated by the process 800.

Figure 9:
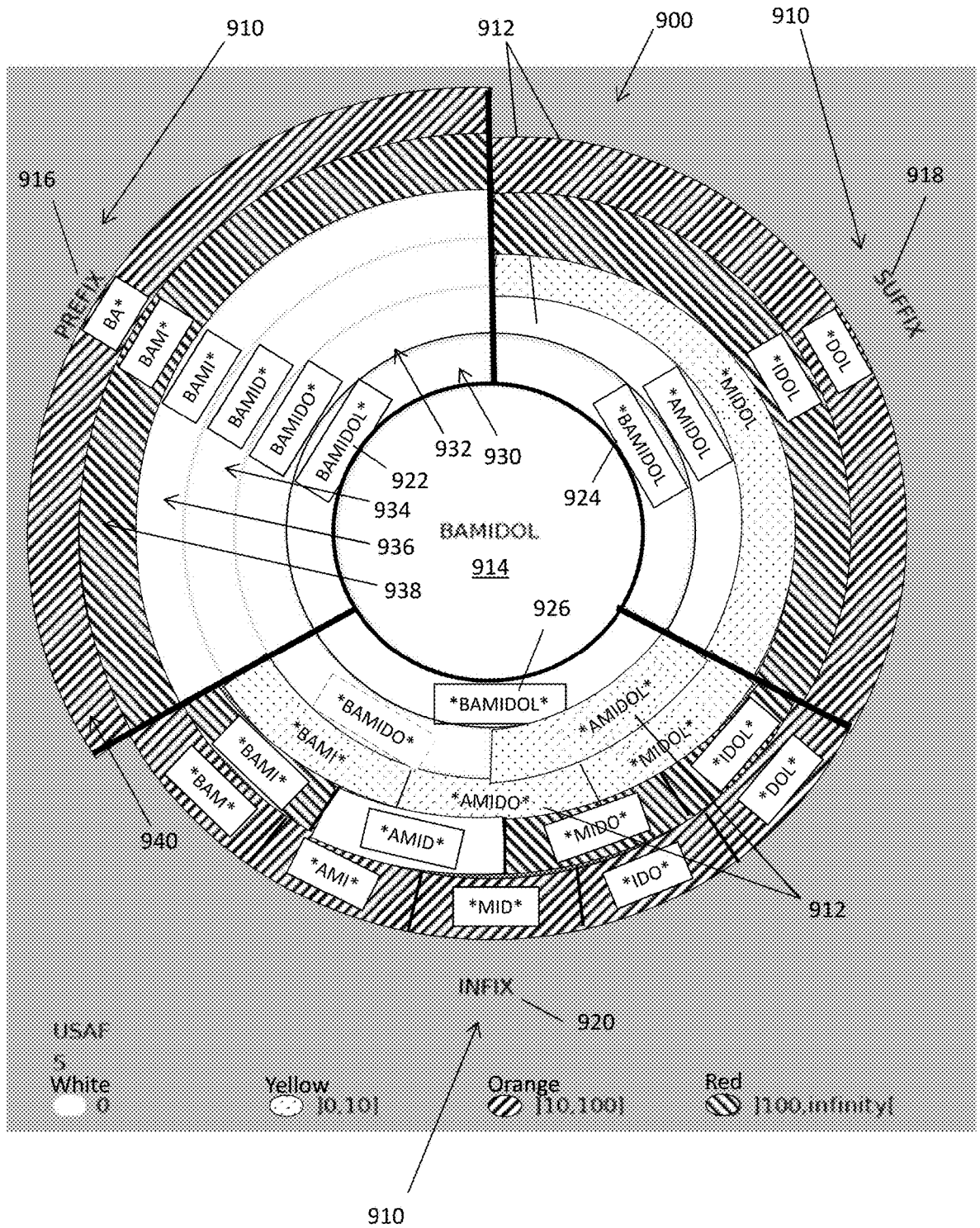
FIG. 9 is a rarity graph that can be used and/or displayed by an embodiment of the system in accordance with embodiments of the present disclosure.

FIG. 9 is a rarity graph 900 that can be used and/or displayed by embodiments of the system 120 in accordance with embodiments of the present disclosure. The rarity graph can provide a graphic that encodes a frequency with which a term, a prefix of a term, a suffix of a term, and/or an infix of a term occur in one of the repositories or databases of terms 112 (FIG. 1).

The rarity graph 900 can be formed as radial segments or sections 910 and circumferential segments or sections 912. The rarity graph 900 can include an inner circle 914 that includes the term (e.g., BAMIDOL) to be evaluated for a frequency with which it and portions of it appear in the database of terms 112 (e.g., a set of trademark registered in the United States Patent and Trademark Office). The radial section 910 corresponds to a prefix section 916, a suffix section 918, and an infix section 920. The circumferential sections 912 correspond to prefixes, suffixes, and infixes of the term in the inner circle 914. The circumferential sections 912 can be formed concentrically about the inner circle 914, where the inner most circumferential sections 912 include the entire term from the inner circle 914, one as a prefix 922 in the prefix section 916, one as a suffix 924 in the suffix section 918, and one as an infix 926 in the infix section 920. The circumferential sections 912 can be arranged in sets according to the sections 910 and are aligned in the radial direction outward from an inner circle 914. The closer a circumferential section is positioned to the inner circle 914, the more characters of the term in the inner circle 914 are included in the circumferential section. Likewise, the further radially outward a circumferential section is positioned from the inner circle 914, the less characters of the term in the inner circle are included circumferential section. As each circumferential section 912 is positioned further radially outward from the inner circle 914, the number of characters of the term that are included can be reduced by one character sequentially.

In the present non-limiting example, in the prefix section 916, there are six circumferential sections 912 beginning with an inner most circumferential section 930 followed by sections 932, 934, 936, 938, and 940 which are concentrically arranged radially away from the inner circle 914. The inner most circumferential section 930 can include the entire term ("BAMIDOL") from the inner circle 914, the circumferential section 932 can include one less character ("BAMIDO") from the term, the circumferential section 934 can include one less character of the term than the circumferential section 932 ("BAMID"), the circumferential section 936 can include one less character of the term than the circumferential section 934 ("BAMI"), the circumferential section 938 can include one less character of the term than the circumferential section 936 ("BAM"), and the circumferential section 940 can include one less character of the term than the circumferential section 938 ("BA").

The prefixes, suffixes, and infixes in the circumferential sections 912 can be each be evaluated to determine a frequency with which the prefixes, suffixes, and infixes appear in the database of terms 112. The circumferential sections can be color coded or otherwise encoded to indicate a frequency with which the prefixes, suffixes, and infixes occur (e.g., 0 occurrences can be white, 1-10 occurrences can be yellow, 10-100 occurrences can be orange, and 100 or more occurrences can be red). In a non-limiting example embodiments, circumferential sections can cease to be added to the rarity graph 900 for each of the prefix section 916, the suffix section 918, and the infix section 920 when a specified frequency of occurrence is determine. For example, in the prefix section, the rarity graph 900 can stop at the outer most circumferential section 940 even though there is another possible prefix ("B") to be evaluated because the frequency of occurrence of the prefix "BA" exceed a threshold frequency (e.g., more than 100 occurrences).

In some embodiments, the rarity graph 900 can be presented to a user via the user interface so that the user can readily discern which prefixes, suffixes, and/or infixes infrequently occur in the database of terms 112. In some embodiments, the rarity graph can be used by the system for determining which prefixes, suffixes, and/or infixes can form candidates for use as seeds in string generation (e.g., the less frequently a prefix, suffix, or infix occurs, the more unique it is and the more likely a unique string can be generated).

FIG. 10 is a table 1000 that illustrates an exemplary training process implemented in accordance with embodiments of the present disclosure. As shown in FIG. 10, the training process can identify a start tag as the start of a new term "TRAVINOL" to use to train one of the machine learning algorithm models 128 using the machine learning algorithm 126. The system executes the machine learning algorithm to perform an iterative process of outputting the next character in response to the last character added to the string until the end tag is reached. The system 120 can use a seed string from each term in the training data. For a term having a length l, there are l+1 training cases, where a corpus of N terms having an average length l results in N*(l+1) training cases.

At each step in the process (with l+1 steps per term), the system 120 executes the machine learning algorithm 126 to attempt to predict the next character in the term from the training data. If the machine learning algorithm correctly predicts the next character, the current weights of the machine learning algorithm (e.g., weights of the connections between nodes of the deep neural network) are left unchanged. If the machine learning algorithm incorrectly predicts the next character of the term from the training data, the current weights are changed slightly to adjust the machine learning algorithms predicted outcome the next time the encountered scenario occurs again. The training process for each machine learning algorithm to predict all of the next characters and adapting the weights of the machine learning algorithm is performed a significant number of times until no further improvement can be observed and the machine learning algorithm is considered to have converged to the best possible model, at which time the machine learning model for a given set of training data is formed.

In the present example, in which the term "TRAVINOL" from the training data is being processed by the machine learning algorithm 126, the machine learning algorithm receives the start tag, and in a first step, outputs a prediction for the next character in response to the start tag. The predicted next character is compared to the actual next character of the term. If the machine learning algorithm correctly predicts the next character (e.g., predicts a "T" is the next character), the weights of the machine learning algorithm are maintained. Otherwise, the weights are adjusted. In a second step, the machine learning receives the start tag and the letter "T", and outputs a prediction for the next character in response to the previous character "T" (and a position of the previous character in the string). The predicted next character is compared to the actual next character of the term. If the machine learning algorithm correctly predicts the next character (e.g., predicts an "R" is the next character), the weights of the machine learning algorithm are maintained. Otherwise, the weights are adjusted. In a third step, the machine learning receives the start tag and the letters "T" and "R", and outputs a prediction for the next character in response to the previous character "R" (and a position of the previous character in the string). If the machine learning algorithm correctly predicts the next character (e.g., predicts an "R" is the next character), the weights of the machine learning algorithm are maintained. Otherwise, the weights are adjusted. The above process can continue for the term until the end tag is reached. Each term in a set of training data is processed by the machine learning algorithm 126 in this manner until the machine learning algorithm 126 has converged on the machine learning model corresponding to the set of training data. For the example where there are forty-five (45) different sets of training data (e.g., one set of training data for each class in the domain-specific data source 110a in FIG. 1), the training process is executed forty-five (45) times such that the machine learning algorithm 126 converges on forty five (45) machine learning algorithm models.

FIG. 11 is a table 1100 that illustrates an exemplary string generation process by a trained and validated machine learning model in accordance with embodiments of the present disclosure. As shown in FIG. 11, the process starts with the start tag and the machine learning model generates a probability distribution including a probability that characters from a set of characters should be the next character. The set of characters can include alphanumeric characters, punctuation or special characters (e.g., ?, !, @, #, $, %, ^, &, *), a space, a start tag (<start>), an end tag (<end>). In the present example, the letter "C" has the highest probability and is output by the model as the next character. In the next iteration, the string including the start tag and the "C" is input to the model, and the model generates a probability distribution based on the input including a probability that characters from a set of characters should be the next character. In this iteration, the letter "A" has the highest probability and is output by the model. In the next iteration, the model receives as the input the start tag and the letters "C" and "A" in that order. The model generates a probability distribution based on the input including a probability that characters from a set of characters should be the next character. In this iteration, the letter "B" has the highest probability and is output by the model as the next character. In the next iteration, the model receives as the input the start tag and the letters "C", "A", and "B" in that order. The model generates a probability distribution based on the input including a probability that characters from a set of characters should be the next character. In this iteration, the end tag <end> has the highest probability and is output by the model as the next character. In response to the output of the end tag, the model completes the string as "CAB".

Figure 12:
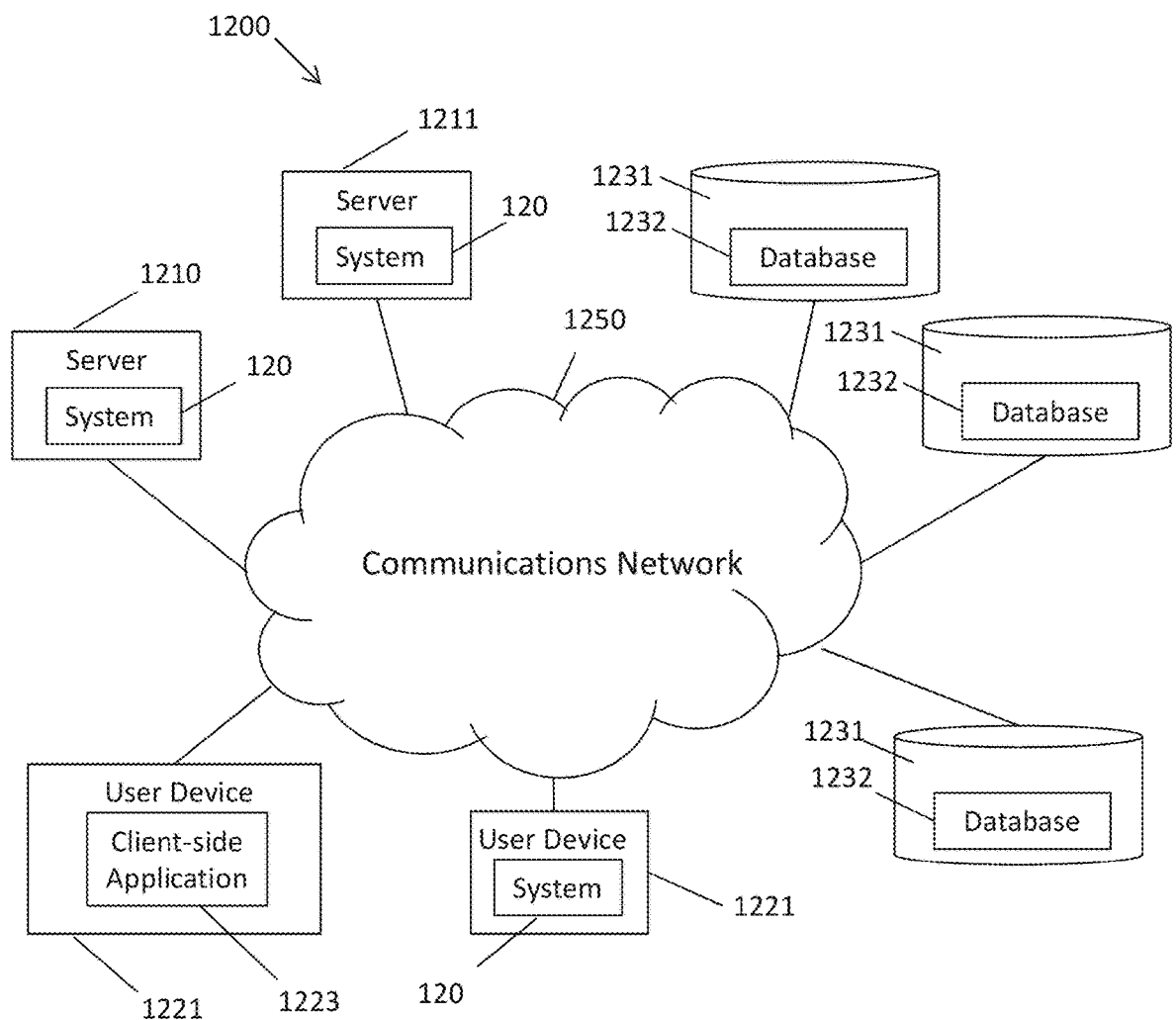
FIG. 12 is a block diagram of computing systems configured to implement embodiments of the present disclosure.

FIG. 12 is a block diagram of computing systems 1200 configured to implement embodiments of the present disclosure. The computing systems 1200 includes servers 1210-1211 operatively coupled to one or more user computing devices 1221, via a communication network 1250, which can be any network over which information can be transmitted between devices communicatively coupled to the network. For example, the communication network 1250 can be the Internet, Intranet, virtual private network (VPN), wide area network (WAN), local area network (LAN), and the like. The environment 1200 can include repositories or databases servers 1231 including database 1232 (e.g., domain-specific data sources 110a-110n), which can be operatively coupled to the servers 1210-1211, as well as to the user computing devices 1221, via the communications network 1250. Embodiments of the system 120 can be implemented on or across the servers 1210-1211, respectively. The servers 1210-1211, user computing devices 1221, and databases servers 1231 can each be implemented as computing devices. An exemplary embodiment of a computing device is shown in FIG. 13.

In exemplary embodiments, the machine learning models and classification models can be trained using data from the databases 1232. The user computing devices 1221 can include a client-side application 1223 programmed and/or configured to permit the devices 1221 to interact with the system 120. For example, in one embodiment, the client-side application 1223 can be a software application programmed and/or including executable code to facilitate interaction with the system 120. The client-side application 1223 can be programmed and/or configured to generate a graphical user interface to allow the user to specify seed strings and to facilitate rendering outputs of the system 120. In some embodiments, the user computing devices 1221 can include an instance of the system 120.

Figure 13:
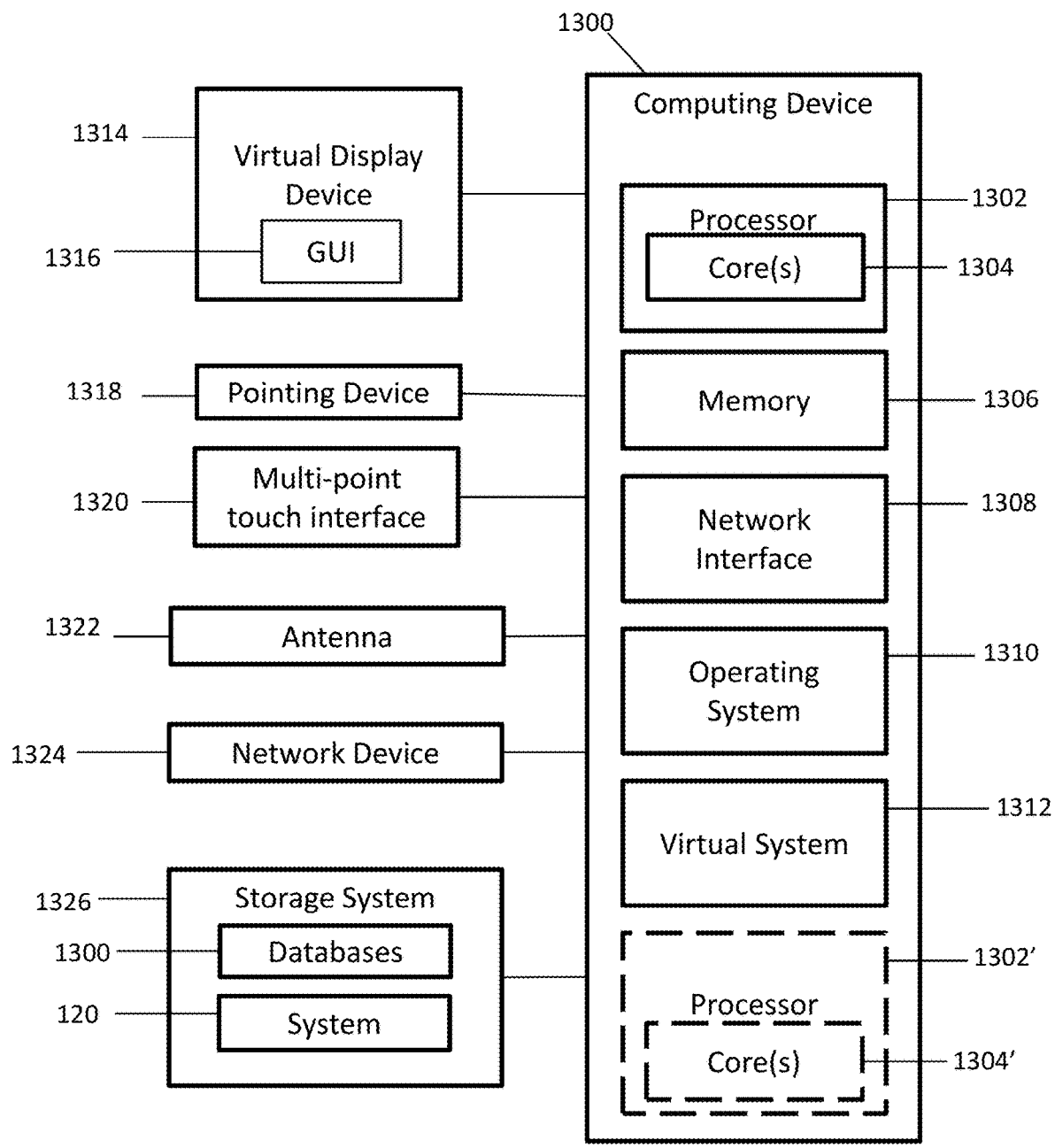
FIG. 13 is a block diagram of an exemplary computing device configured to interface with and/or implement a system for training a series of machine learning models and employing the trained machine learning models for unique string generation and predictive analysis of generated strings in accordance with embodiments of the present disclosure.

FIG. 13 is a block diagram of an example computing device for implementing exemplary embodiments. The computing device 1300 may be, but is not limited to, a smartphone, laptop, tablet, desktop computer, server or network appliance. The computing device 1300 can be embodied as part of a computing system. The computing device 1300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 1306 included in the computing device 1300 may store computer-readable and computer-executable instructions or software (e.g., the system 120 or portions thereof) for implementing exemplary embodiments of the present disclosure. The computing device 1300 also includes configurable and/or programmable processor 1302 and associated core(s) 1304, and optionally, one or more additional configurable and/or programmable processor(s) 1302' and associated core(s) 1304' (for example, in the case of computer systems having multiple processors/cores), for executing computer-readable and computer-executable instructions or software stored in the memory 1306 and other programs for implementing exemplary embodiments. Processor 1302 and processor(s) 1302' may each be a single core processor or multiple core (1304 and 1304') processor. Either or both of processor 1302 and processor(s) 1302' may be configured to execute one or more of the instructions described in connection with computing device 1300.

Virtualization may be employed in the computing device 1300 so that infrastructure and resources in the computing device 1300 may be shared dynamically. A virtual machine 1312 may be provided to handle a process running on multiple processors so that the process appears to be using only one computing resource rather than multiple computing resources. Multiple virtual machines may also be used with one processor.

Memory 1306 may include a computer system memory or random access memory, such as DRAM, SRAM, EDO RAM, and the like. Memory 1306 may include other types of memory as well, or combinations thereof.

A user may interact with the computing device 1300 through a visual display device 1314, such as a computer monitor, which may display one or more graphical user interfaces 1316, multi touch interface 1320, and/or a pointing device 1318.

The computing device 1300 may also include one or more storage devices 1326, such as a hard-drive, CD-ROM, or other computer readable media, for storing data and computer-readable instructions and/or software that implement exemplary embodiments (e.g., the system 120). For example, exemplary storage device 1326 can include one or more databases 1328 for storing information regarding training data, test data, machine learning models, class prediction models, generated terms, and/or class predictions for generated terms.

The computing device 1300 can include a network interface 1308 configured to interface via one or more network devices 1324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 1322 to facilitate wireless communication (e.g., via the network interface) between the computing device 1300 and a network and/or between the computing device 1300 and other computing devices. The network interface 1308 may include a built-in network adapter, network interface card, PCMCIA network card, card bus network adapter, wireless network adapter, USB network adapter, modem or any other device suitable for interfacing the computing device 1300 to any type of network capable of communication and performing the operations described herein.

The computing device 1300 may run operating system 1310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 1300 and performing the operations described herein. In exemplary embodiments, the operating system 1310 may be run in native mode or emulated mode. In an exemplary embodiment, the operating system 1310 may be run on one or more cloud machine instances.

FIGS. 14-19 illustrate various outputs 1400-1900 of an embodiment of the system 120, respectively, in accordance with embodiments of the present disclosure. In the example outputs shown in FIGS. 14-19, the seed sting is "FRI" and the string generator of the system 120 completes the string by executing a trained and validated machine learning model. The shaded terms in the output correspond to terms that already exist in the domain-specific data source from which the model is derived.

FIG. 14 shows a list 1400 of terms generated by one of the machine learning models 130 in FIG. 1. The model was executed by the system with its creativity factor is set to 0.0. The model was executed with a high tolerance, which indicates that the chance that the terms were generated can be highly "unexpected". The model was also executed with a high class bias, which indicates that the machine learning model determines the class predicted for the terms is the intended class. To arrive at the class bias, the chance of the class intended for generation is compared against the chance of the class predicted by the class predictor. As one example, a class bias value of 1.0 indicates that the: class for which the term was generated is the same as the class predicted by the machine learning model. As another example, a class bias value of 0.5 indicates that the class predicted by the machine learning model is twice as likely as the class for which the term was generated.

FIG. 15 shows a list 1500 of terms generated by one of the machine learning models 130 in FIG. 1. The model was executed by the system with its creativity factor set to near 0.0. The model was executed with a high tolerance, which indicates that the chance that the terms were generated can be highly "unexpected". The model was also executed with a high class bias, which indicates that the machine learning model determines the class predicted for the terms is the intended class.

FIG. 16 shows a list 1600 of terms generated by one of the machine learning models 130 in FIG. 1. The model was executed by the system with its creativity factor set to near 0.5. The model was executed with a high tolerance, which indicates that the chance that the terms were generated can be highly "unexpected". The model was also executed with a high class bias, which indicates that the machine learning model determines the class predicted for the terms is the intended class.

FIG. 17 shows a list 1700 of terms generated by one of the machine learning models 130 in FIG. 1. The model was executed by the system with its creativity factor set to 0.0. The model was executed with a low tolerance, which indicates that the chance that the terms were generated was highly "expected". The model was also executed with a low class bias, which indicates that the machine learning model determines the class predicted for the terms is not the intended class.

FIG. 18 shows a list 1800 of terms generated by one of the machine learning models 130 in FIG. 1. The model was executed by the system with its creativity factor set to near 0.0. The model was executed with a low tolerance, which indicates that the chance that the terms were generated was highly "expected". The model was also executed with a low class bias, which indicates that the machine learning model determines the class predicted for the terms is not the intended class.

FIG. 19 shows a list 1900 of terms generated by one of the machine learning models 130 in FIG. 1. The model was executed by the system with its creativity factor set to near 0.5. The model was executed with a low tolerance, which indicates that the chance that the terms were generated was highly "expected". The model was also executed with a low class bias, which indicates that the machine learning model determines the class predicted for the terms is not the intended class.

Figure 20:
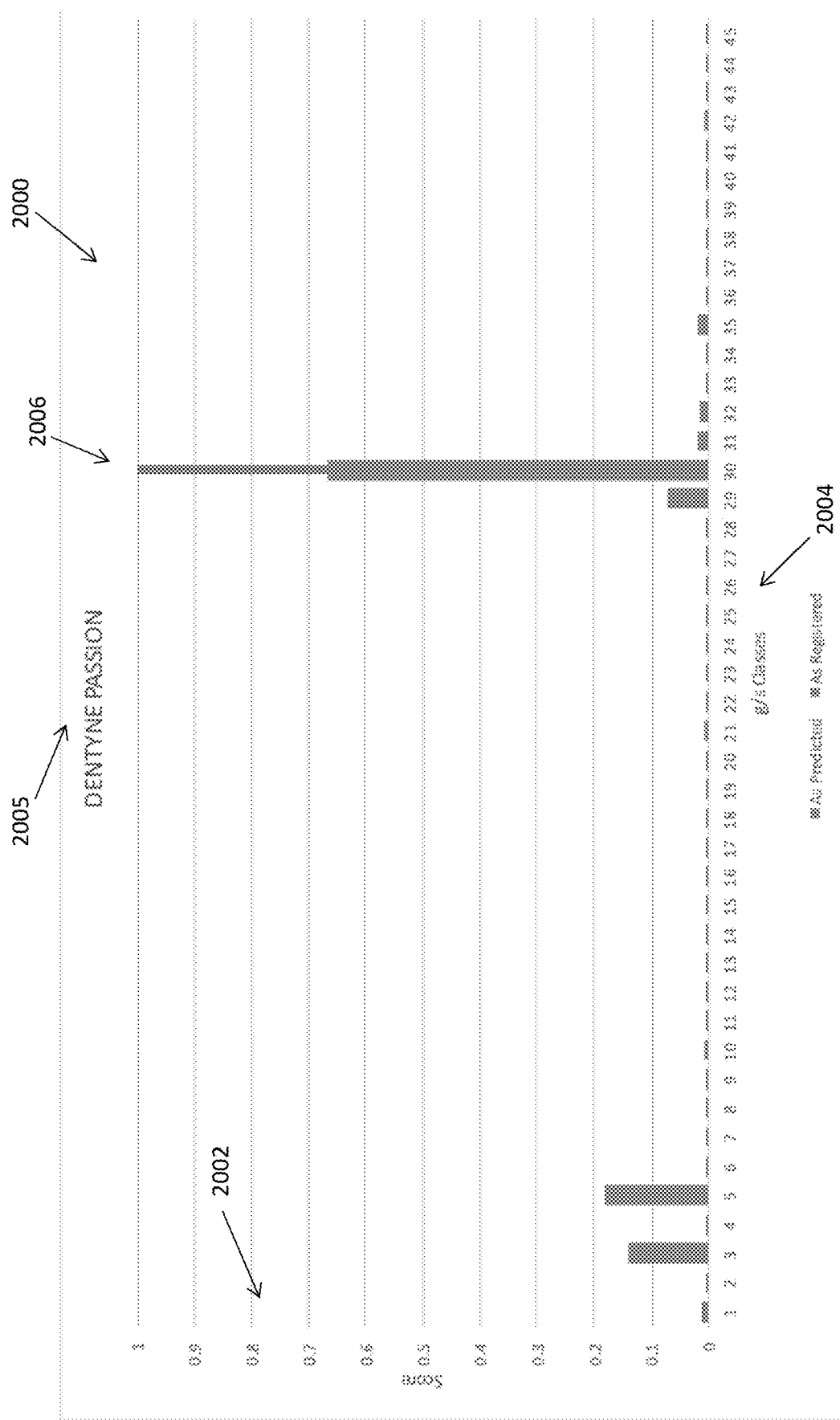
FIG. 20 is a graph that illustrates a class prediction output of the system for training a series of machine learning models and employing the trained machine learning models for unique string generation and predictive analysis of generated strings in accordance with embodiments of the present disclosure.

FIG. 20 is a graph 2000 that illustrates a class prediction test output of an embodiment of the system 120 in accordance with embodiments of the present disclosure. The y-axis 2002 corresponds to a score value and the x-axis 2004 corresponds to classes. As shown by the distribution in the graph 2000, the term "DENTYNE PASSION" 2005 has been classified by the class predictor as falling into several classes. The term 2005 has been found to exist in the domain-specific data source at class 30. The graph 2000 shows that the class predictors identifies class 30 as the class the term 2005 most likely would be associated with, but also identifies other classes for the term 2005 in which the term 2005 does not exist.

Figure 21:
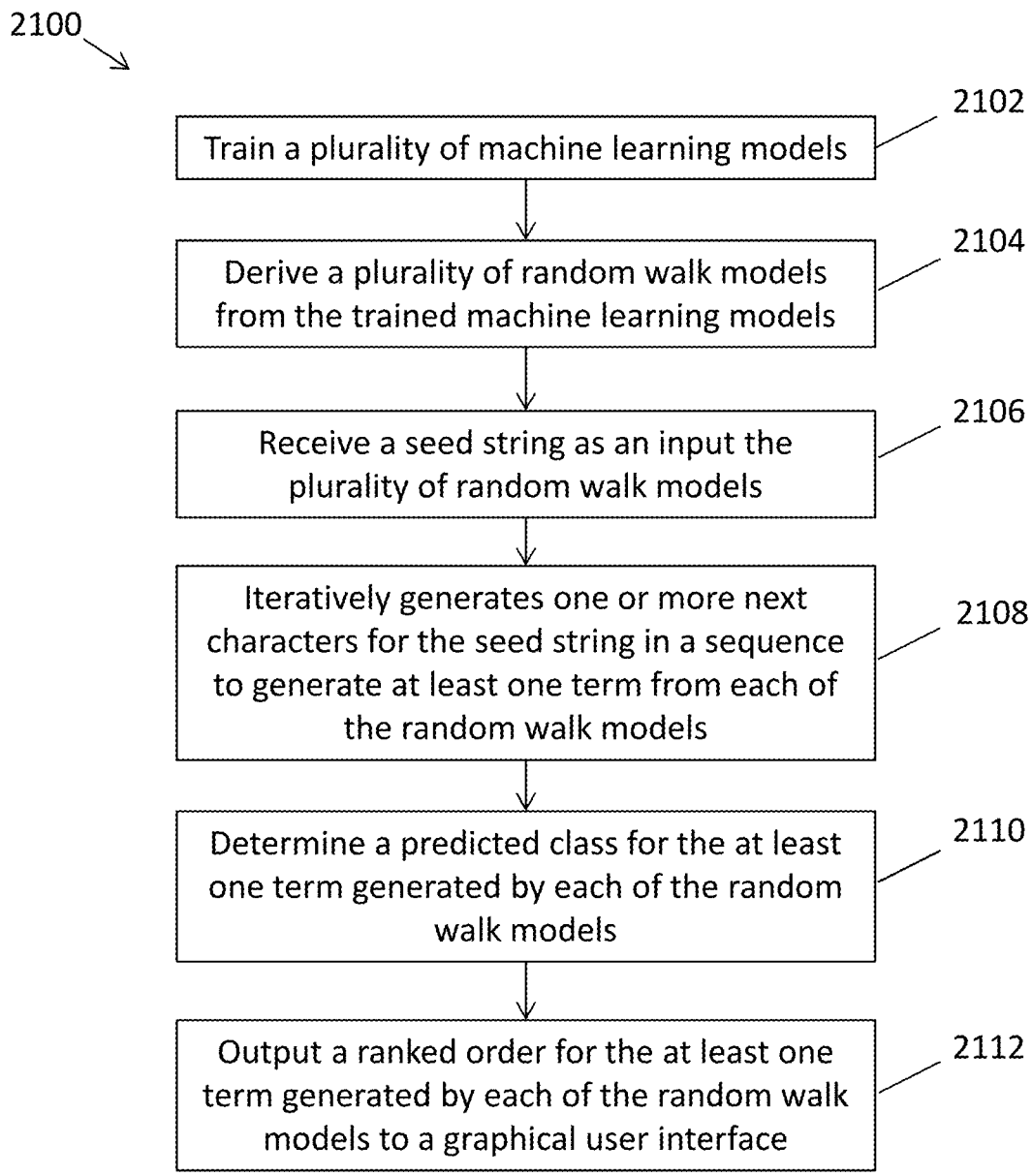
FIG. 21 is a flowchart illustrating an exemplary process for generating a term from a user-specified seed string in accordance with embodiments of the present disclosure.

FIG. 21 is a flowchart illustrating an exemplary process 2100 for generating a term from a user-specified seed string in accordance with embodiments of the present disclosure. At step 2102, a machine learning algorithm of an embodiment of the system 120 in FIG. 1 is executed by a processing device (e.g., processing device 1002 in FIG. 10) using training data from one or more domain-specific data sources as described herein and machine learning models are generated in response to the execution. The machine learning models can be separate and distinct from each other and can be generated using different subsets of the training data (e.g., divided by class). At step 2104, random walk models of an embodiment of the string generator 132 are derived by the processing device from the trained machine learning models. A seed string is received by the string generator being executed by the processing device as an input to the random walk models from an embodiment of the user interface 138 or an embodiment of the semantic expander 150 in FIG. 1. At step 2106, each of the random walk models of the string generator are executed by the processing device to iteratively generate a sequence of one or more next and/or previous characters for the seed string to generate at least one term from each of the random walk models. At step 2110, a predicted class for the at least one term generated by each of the random walk models is determined by a classification model of an embodiment of the class predictor 140 being executed by the processor. At step 2112, a ranked order for the at least one term generated by system is output to a graphical user interface.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The foregoing description of the specific embodiments of the subject matter disclosed herein has been presented for purposes of illustration and description and is not intended to limit the scope of the subject matter set forth herein. It is fully contemplated that other various embodiments, modifications and applications will become apparent to those of ordinary skill in the art from the foregoing description and accompanying drawings. Thus, such other embodiments, modifications, and applications are intended to fall within the scope of the following appended claims. Further, those of ordinary skill in the art will appreciate that the embodiments, modifications, and applications that have been described herein are in the context of particular environment, and the subject matter set forth herein is not limited thereto, but can be beneficially applied in any number of other manners, environments and purposes. Accordingly, the claims set forth below should be construed in view of the full breadth and spirit of the novel features and techniques as disclosed herein.

What is claimed is:

1. A method for generating strings based on one or more seed strings, the method comprising:
    training a plurality of machine learning models;
    deriving a plurality of random walk models from the trained plurality of machine learning models;
    receiving one or more seed strings as an input to the plurality of random walk models;
    automatically iteratively generating, by each of the plurality of random walk models, one or more next characters for the one or more seed strings to generate at least one term from each of the random walk models, the at least one term from each of the random walk models includes all characters in the one or more seed strings in addition to the one or more next characters; and
    outputting a ranked order for the at least one term generated by each of the random walk models to a graphical user interface.

2. The method of claim 1, further comprising:
    determining a predicted class for the at least one term generated by each of the random walk models.

3. The method of claim 1, wherein training the plurality of machine learning algorithms comprises
    identifying a data source including a plurality of terms, each of the plurality of terms being associated with at least one of a plurality of classifications;
    identifying a plurality of sets of training data from the data source, each of the plurality of sets of training data including a subset of terms for a different one of the plurality of classifications; and
    training each of the plurality of machine learning algorithms using a different one of the plurality of sets of training data to bias each of the plurality of machine learning algorithms to a different one of the classifications.

4. The method of claim 1, wherein iteratively generating one or more next characters for the one or more seed strings comprises:
    (a) generating a probability distribution including a probability that characters from a set of characters should be a next character;
    (b) outputting, via the at least one of the plurality of random walk models, a first one of the characters as the next character after the start tag based on one or more selection parameters utilized by the at least one of the plurality of random walk models; and
    (c) repeating steps (a) and (b) until the next character output is an end tag.

5. The method of claim 1, wherein at least one of the plurality of machine learning algorithms is trained by:
    (a) executing the at least one of the plurality of machine learning algorithms to attempt to predict a next character in a term from a set of training data;
    (b) in response to the at least one of the plurality machine learning machine algorithms correctly predicted the next character of the term, maintaining current weights of the at least one of the plurality of machine learning algorithms;
    (c) in response to the at least one of the plurality of machine learning algorithms incorrectly predicting the next character of the term, modifying the current weights to adjust the at least one of the plurality of machine learning algorithms predicted outcome a next time an encountered scenario recurs; and
    (d) repeating steps a through c until the at least one of the plurality of machine learning algorithms has converged.

6. The method of claim 1, further comprising generating variants of the at least one term.

7. The method of claim 6, further comprising:
    generating a similarity score for each of the variants; and
    determining whether to select or discard each one of the variants based on the similarity score.

8. The method of claim 7, further comprising:
    selecting at least one of the variants; and
    performing at least one of determining a predicted class of the at least one of the variants or generating additional variants from the at least one of the variants.

9. The method of claim 1, further comprising:
    receiving one or more descriptive terms from a user;
    identifying one or more words that are semantically related to the one or more descriptive terms;
    partitioning the one or more words into parts for prefixes, suffixes, and infixes; and
    generating the one or more seed strings based on the parts.

10. A system for generating strings based on a seed string, the system comprising:
   a non-transitory computer-readable medium storing training data; and
   a processing device in communication with the non-transitory computer-readable medium, the processing device configured to:
   train a plurality of machine learning models using the training data;
   derive a plurality of random walk models from the trained machine learning models;
   receive a seed string as an input the plurality of random walk models;
   automatically iteratively generate, by each of the plurality of random walk models, one or more next characters for the seed string to generate at least one term from each of the random walk models, the at least one term form each of the random walk models m includes all characters in the one or more seed strings in addition to the one or more next characters; and
   output a ranked order for the at least one term generated by each of the random walk models to a graphical user interface.

11. The system of claim 10, wherein the processing device configured to determine a predicted class for the at least one term generated by each of the random walk models.

12. The system of claim 10, wherein the plurality of machine learning algorithms are trained by:
   identifying a data source including a plurality of terms;
   identifying a plurality of sets of training data from the data source, each of the plurality of sets of training data including a subset of terms for a different one of the plurality of classifications; and
   training each of the plurality of machine learning algorithms using a different one of the plurality of sets of training data to bias each of the plurality of machine learning algorithms to a different one of the classifications.

13. The system of claim 10, wherein the processing device is configured to iteratively generating one or more next characters for the one or more seed strings by:
   (a) generating a probability distribution including a probability that characters from a set of characters should be a next character;
   (b) outputting, via the at least one of the plurality of random walk models, a first one of the characters as the next character after the start tag based on the probability distribution; and
   (c) repeating steps (a) and (b) until the next character output is an end tag.

14. The system of claim 10, wherein at least one of the plurality of machine learning algorithms is trained by:
   (a) executing the at least one of the plurality of machine learning algorithms to attempt to predict a next character in a term from a set of training data;
   (b) in response to the at least one of the plurality machine learning machine algorithms correctly predicted the next character of the term, maintaining current weights of the at least one of the plurality of machine learning algorithms;
   (c) in response to the at least one of the plurality of machine learning algorithms incorrectly predicting the next character of the term, modifying the current weights to adjust the at least one of the plurality of machine learning algorithms predicted outcome a next time an encountered scenario recurs; and
   (d) repeating steps a through c until the at least one of the plurality of machine learning algorithms has converged.

15. The system of claim 10, wherein the processing device is configured to generate variants of the at least one term.

16. The system of claim 15, wherein the processing device is configured to:
   generate a similarity score for each of the variants; and
   determine whether to select or discard each one of the variants based on the similarity score.

17. The system of claim 16, wherein the processing device is configured to:
   select at least one of the variants; and
   perform at least one of determining a predicted class of the at least one of the variants or generating additional variants from the at least one of the variants.

18. The system of claim 10, wherein the processing device is configured to:
   receive one or more descriptive terms from a user;
   identify one or more words that are semantically related to the one or more descriptive terms;
   partition the one or more words into parts for prefixes, suffixes, and infixes; and
   generate the one or more seed strings based on the parts.

19. A non-transitory computer-readable medium storing instructions, wherein execution of the instructions by a processing device causes the processing device to implement a method comprising:
   training a plurality of machine learning models;
   deriving a plurality of random walk models from the trained machine learning models;
   receiving a seed string as an input the plurality of random walk models;
   automatically iteratively generating, by each of the plurality of random walk models, one or more next characters for the seed string to generate at least one term from each of the random walk models, the at least one term from each of the random walk models includes all characters in the one or more seed strings in addition to the one or more next characters; and
   outputting a ranked order for the at least one term generated by each of the random walk models to a graphical user interface.

20. The medium of claim 19, wherein execution of the instructions by the processing device causes the processing device to determine a predicted class for the at least one term generated by each of the random walk models.

* * * * *